United States Patent
Prabhu et al.

(10) Patent No.: US 11,397,808 B1
(45) Date of Patent: Jul. 26, 2022

(54) ATTACK DETECTION BASED ON GRAPH EDGE CONTEXT

(71) Applicant: Confluera, Inc., Palo Alto, CA (US)

(72) Inventors: Vinay Prabhu, Mountain View, CA (US); Pradeep Gopanapalli Venkata, Mountain View, CA (US); Chamnan So, San Francisco, CA (US); Sandeep Siroya, Cupertino, CA (US); Niloy Mukherjee, Mountain View, CA (US)

(73) Assignee: Confluera, Inc., Palo Alto, CA (US)

( * ) Notice: Subject to any disclaimer, the term of this patent is extended or adjusted under 35 U.S.C. 154(b) by 0 days.

(21) Appl. No.: 17/465,209

(22) Filed: Sep. 2, 2021

(51) Int. Cl.
| G06F 21/55 | (2013.01) |
| G06F 21/62 | (2013.01) |
| G06F 21/57 | (2013.01) |
| G06F 21/56 | (2013.01) |

(52) U.S. Cl.
CPC ......... *G06F 21/552* (2013.01); *G06F 21/566* (2013.01); *G06F 21/577* (2013.01); *G06F 21/6218* (2013.01)

(58) Field of Classification Search
CPC .... G06F 21/552; G06F 21/566; G06F 21/577; G06F 21/6218
See application file for complete search history.

(56) References Cited

U.S. PATENT DOCUMENTS

| 5,001,628 | A   | 3/1991  | Johnson et al. |
| 7,890,869 | B1  | 2/2011  | Mayer et al. |
| 8,799,462 | B2* | 8/2014  | McHugh ............... G06F 21/577 709/224 |
| 8,925,076 | B2* | 12/2014 | Zaitsev ................. G06F 21/554 726/22 |
| 9,967,265 | B1  | 5/2018  | Peer et al. |
| 10,102,374 | B1 | 10/2018 | Cohen et al. |
| 10,121,000 | B1 | 11/2018 | Rivlin et al. |
| 10,218,588 | B1* | 2/2019 | Brisebois ........... G06Q 10/1095 |
| 10,257,219 | B1 | 4/2019  | Gell et al. |
| 10,389,738 | B2 | 8/2019  | Muddu et al. |
| 10,417,424 | B2 | 9/2019  | Cohen et al. |
| 10,419,450 | B2 | 9/2019  | Muddu et al. |

(Continued)

OTHER PUBLICATIONS

U.S. Appl. No. 16/521,821, filed Jul. 25, 2019, Abhijit Ghosh et al.

(Continued)

*Primary Examiner* — Joseph P Hirl
*Assistant Examiner* — Stephen T Gundry
(74) *Attorney, Agent, or Firm* — Goodwin Procter LLP

(57) ABSTRACT

Infrastructure attacks based on graph edge context are identified by receiving an execution graph constructed by a central service based on behaviors monitored by a plurality of agents deployed on respective systems including a first system. The execution graph comprises a plurality of execution trails. One or more tags are applied to each edge of an execution trail of the execution graph based on at least one of temporal context or spatial context associated with the edge. One or more behaviors associated with the edge of the execution trail happen across an enterprise infrastructure involving the first system. The execution trail enriched with the one or more tags is analyzed. An action that is performed to mitigate security risks in the execution graph is determined based on the analysis.

20 Claims, 17 Drawing Sheets

(56) References Cited

U.S. PATENT DOCUMENTS

| | | | |
|---|---|---|---|
| 10,425,429 B2 | 9/2019 | Bassett | |
| 10,652,266 B1 | 5/2020 | Tautschnig et al. | |
| 2004/0177244 A1 | 9/2004 | Murphy et al. | |
| 2006/0026688 A1* | 2/2006 | Shah | H04L 41/28 726/25 |
| 2006/0070127 A1* | 3/2006 | Friedlander | G16H 10/60 726/22 |
| 2007/0209075 A1 | 9/2007 | Coffman | |
| 2009/0204696 A1 | 8/2009 | Zhang et al. | |
| 2009/0248465 A1 | 10/2009 | Recce et al. | |
| 2010/0180344 A1 | 7/2010 | Malyshev et al. | |
| 2010/0257253 A1 | 10/2010 | Saha et al. | |
| 2011/0265182 A1 | 10/2011 | Peinado et al. | |
| 2012/0023324 A1* | 1/2012 | Sorensen | H04L 63/1416 713/151 |
| 2012/0023576 A1* | 1/2012 | Sorensen | G06F 21/70 726/22 |
| 2012/0066763 A1* | 3/2012 | McHugh | H04L 63/20 726/22 |
| 2012/0255003 A1 | 10/2012 | Sallam | |
| 2013/0318604 A1* | 11/2013 | Coates | G06F 16/285 726/22 |
| 2014/0245376 A1 | 8/2014 | Hibbert et al. | |
| 2014/0359776 A1 | 12/2014 | Liu | |
| 2015/0074806 A1 | 3/2015 | Roundy et al. | |
| 2015/0244734 A1* | 8/2015 | Olson | G06F 21/577 726/25 |
| 2016/0042179 A1 | 2/2016 | Weingarten et al. | |
| 2016/0078365 A1 | 3/2016 | Baumard | |
| 2016/0088000 A1* | 3/2016 | Siva Kumar | H04L 63/10 726/23 |
| 2016/0099953 A1 | 4/2016 | Hebert et al. | |
| 2016/0099960 A1 | 4/2016 | Gerritz et al. | |
| 2016/0191532 A1 | 6/2016 | Seiver et al. | |
| 2016/0205122 A1 | 7/2016 | Bassett | |
| 2016/0217282 A1 | 7/2016 | Vecera et al. | |
| 2016/0253232 A1* | 9/2016 | Puri | G06F 21/552 714/37 |
| 2016/0275288 A1 | 9/2016 | Sethumadhavan et al. | |
| 2016/0337387 A1 | 11/2016 | Hu et al. | |
| 2016/0371489 A1 | 12/2016 | Puri et al. | |
| 2016/0373481 A1 | 12/2016 | Sultan et al. | |
| 2017/0006055 A1 | 1/2017 | Strom et al. | |
| 2017/0041338 A1 | 2/2017 | Martini et al. | |
| 2017/0068709 A1 | 3/2017 | Dasgupta et al. | |
| 2017/0078322 A1 | 3/2017 | Seiver et al. | |
| 2017/0118240 A1 | 4/2017 | Devi Reddy et al. | |
| 2017/0134247 A1 | 5/2017 | Hoja et al. | |
| 2017/0244729 A1 | 8/2017 | Fahrny et al. | |
| 2017/0289187 A1 | 10/2017 | Noel et al. | |
| 2017/0300690 A1 | 10/2017 | Ladnai et al. | |
| 2017/0300701 A1 | 10/2017 | Ponta et al. | |
| 2018/0060144 A1 | 3/2018 | Capobianco et al. | |
| 2018/0077187 A1 | 3/2018 | Garman et al. | |
| 2018/0144138 A1 | 5/2018 | Zhang | |
| 2018/0219888 A1 | 8/2018 | Apostolopoulos | |
| 2018/0316715 A1 | 11/2018 | Liu et al. | |
| 2018/0351817 A1 | 12/2018 | Aggarwal et al. | |
| 2018/0351991 A1 | 12/2018 | Jones et al. | |
| 2019/0036959 A1 | 1/2019 | Ford et al. | |
| 2019/0081971 A1 | 3/2019 | Jones et al. | |
| 2019/0087756 A1* | 3/2019 | Hull | G06Q 10/06316 |
| 2019/0141058 A1* | 5/2019 | Hassanzadeh | H04L 63/0227 |
| 2019/0158520 A1 | 5/2019 | DiValentin et al. | |
| 2019/0258800 A1 | 8/2019 | Ladnai et al. | |
| 2019/0370146 A1* | 12/2019 | Babu | G06F 11/3089 |
| 2019/0373005 A1 | 12/2019 | Bassett | |
| 2020/0059481 A1* | 2/2020 | Sekar | H04L 63/1416 |
| 2020/0125732 A1* | 4/2020 | Iyer | G06F 8/33 |
| 2020/0356873 A1* | 11/2020 | Nawrocke | G06F 16/24556 |
| 2021/0042638 A1* | 2/2021 | Novotny | G06F 11/3438 |
| 2021/0081819 A1* | 3/2021 | Polleri | G06N 3/006 |
| 2021/0081837 A1* | 3/2021 | Polleri | G06F 8/41 |
| 2021/0081848 A1* | 3/2021 | Polleri | G06K 9/6259 |
| 2021/0191718 A1* | 6/2021 | Draude | G06F 8/77 |
| 2021/0241168 A1* | 8/2021 | Sarferaz | G06F 9/5061 |
| 2021/0286785 A1* | 9/2021 | Mahanta | G06F 11/3612 |

OTHER PUBLICATIONS

U.S. Appl. No. 16/523,494, filed Jul. 26, 2019, Abhijit Ghosh et al.
U.S. Appl. No. 16/521,855, filed Jul. 25, 2019, Abhijit Ghosh et al.
U.S. Appl. No. 16/522,056, filed Jul. 25, 2019, Abhijit Ghosh et al.
U.S. Appl. No. 16/522,104, filed Jul. 25, 2019, Abhijit Ghosh et al.
U.S. Appl. No. 16/522,342, filed Jul. 25, 2019, Abhijit Ghosh et al.
U.S. Appl. No. 16/903,785, filed Jun. 17, 2020, Eun-Gyu Kim et al.
U.S. Appl. No. 17/162,167, filed Jan. 29, 2021, Eun-Gyu Kim et al.
U.S. Appl. No. 17/490,697, filed Sep. 30, 2021, Vinay Prabhu et al.
T. Y. Win, H. Tianfield and Q. Mair, "Big Data Based Security Analytics for Protecting Virtualized Infrastructures in Cloud Computing." IEEE Transactions on Big Data, 4(1), pp. 11-25 (2018).
https://scholar.google.com/scholar "Monitoring Agent Operating Systems" Sep. 24, 2019.
King, S. et al., Backtracking Intrusions, ACM Transactions on Computer Systems, vol. 23, No. 1, (Feb. 2005), pp. 51-76.
Sitaraman, S. et al., Forensic Analysis of File System Intrusions using Improved Backtracking, (2005) IEEE, 10 pages.

* cited by examiner

ATTACK DETECTION BASED ON GRAPH EDGE CONTEXT

FIELD OF THE INVENTION

The present disclosure relates generally to network security, and, more specifically, to systems and methods for identifying infrastructure attacks based on graph edge context through enterprise infrastructure or other systems and networks.

BACKGROUND

The primary task of enterprise security is to protect critical assets. These assets include mission critical business applications, customer data, intellectual property, and databases residing on-premises or in the cloud. The security industry focuses on protecting these assets by preventing entry through endpoint devices and networks. However, end points are indefensible as they are exposed to many attack vectors such as social engineering, insider threats, and malware. With ever increasing mobile workforce and dynamic workloads, the network perimeter also no longer exists. With ever increasing breaches, flaws in enterprise security are exposed on a more frequent basis.

The typical attack timeline on critical infrastructure consists of initial entry, undetected persistence, and ultimate damage, with persistence being in a matter of minutes, hours, weeks, or months using sophisticated techniques. However, security solutions focus on two ends of the spectrum: either on entry prevention in hosts and networks, or on ex post facto forensics to identify the root cause. Such retroactive analysis often involves attempts to connect the dots across a plethora of individual weak signals coming from multiple silo sources with potential false positives. As a result, the critical phase during which attacks progress in the system and stealthily change their appearance and scope often remains undetected.

Traditional security solutions are unable to deterministically perform attack progression detection for multiple reasons. These solutions are unimodal, and rely either on artifact signatures (e.g., traditional anti-virus solutions) or simple rules to detect isolated behavioral indicators of compromise. The individual sensors used in these approaches are, by themselves, weak and prone to false positives. An individual alert is too weak a signal to deterministically infer that an attack sequence is in progress. Another reason is that, while an attacker leaves traces of malicious activity, the attack campaign is often spread over a large environment and an extended period of time. Further, the attacker often has the opportunity to remove evidence before a defender can make use of it. Today, security operations teams have to make sense out of a deluge of alerts from many individual sensors not related to each other. A typical incidence response to an alert is onion peeling, a process of drilling down and pivoting from one log to another. This form of connecting the dots looking for an execution trail from a large volume of information is beyond human capacity. Enhanced techniques for intercepting and responding to infrastructure-wide attacks are needed.

Enterprise network and workload infrastructure have been managed and restricted by traditional policies that work on entities such as host/network/interface/process. The traditional policy definition and control may suffice when the entities and applications were running in a centralized environment (e.g., in private data centers with a hub and particular relationship). However, when the enterprise network moves into the cloud and the workload infrastructure is provided as a service, the significance of the entities (e.g., host, process) has diminished and turned ephemeral. The traditional policy mechanism that was strictly applied to the entities cannot scale, learn, or adapt to the new infrastructure. Additionally, while there currently exist approaches used for detecting malicious attacks that use various techniques and policies, such approaches do not detect an ongoing attack progression across multiple hosts, and, subsequently, fail to capture the path taken by an attacker migrating among clients over an extended period of time.

BRIEF SUMMARY

In one aspect, a computer-implemented method for identifying infrastructure attacks based on graph edge context includes the steps of: receiving an execution graph constructed by a central service based on behaviors monitored by a plurality of agents deployed on respective systems including a first system, wherein the execution graph comprises a plurality of execution trails; applying one or more tags to each edge of an execution trail of the execution graph based on at least one of temporal context or spatial context associated with the edge, wherein one or more behaviors associated with the edge of the execution trail happen across an enterprise infrastructure involving the first system; analyzing the execution trail enriched with the one or more tags; and determining, based on the analysis, an action that is performed to mitigate security risks in the execution graph. Other aspects of the foregoing including corresponding systems having memories storing instructions executable by a processor, and computer-executable instructions stored on non-transitory computer-readable storage media.

In one implementation, a type of behavior associated with each edge of the execution trail is identified, and applying the one or more tags to each edge of the execution trail is based on the identified type of behavior. It is also determined whether at least one of the one or more tags meets a policy criterion. The policy criterion is defined for the enterprise infrastructure of the first system. Responsive to determining that the at least one tag meets the enterprise infrastructure, the action is determined. The action is customized to the enterprise infrastructure of the first system and is performed to mitigate the security risks. The action comprises at least one of notifying a status of the edge, logging the action in a log server, generating a report, maintaining a whitelist, or performing a response action by blocking the edge, quarantining the edge, or killing a behavior associated with the edge.

In one implementation, applying the one or more tags to each edge of the execution trail comprises tagging the edge as malicious or benign based on a set of rules, and is also based on a frequency of occurrences of a type of behavior in the execution graph. The execution graph comprises a plurality of nodes and a plurality of edges connecting the nodes, each node represents an entity comprising a process or an artifact, each edge represents an event associated with the entity, and each execution trail is associated with a subset of the nodes and edges of the execution graph.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings.

DETAILED DESCRIPTION

Figure 1:
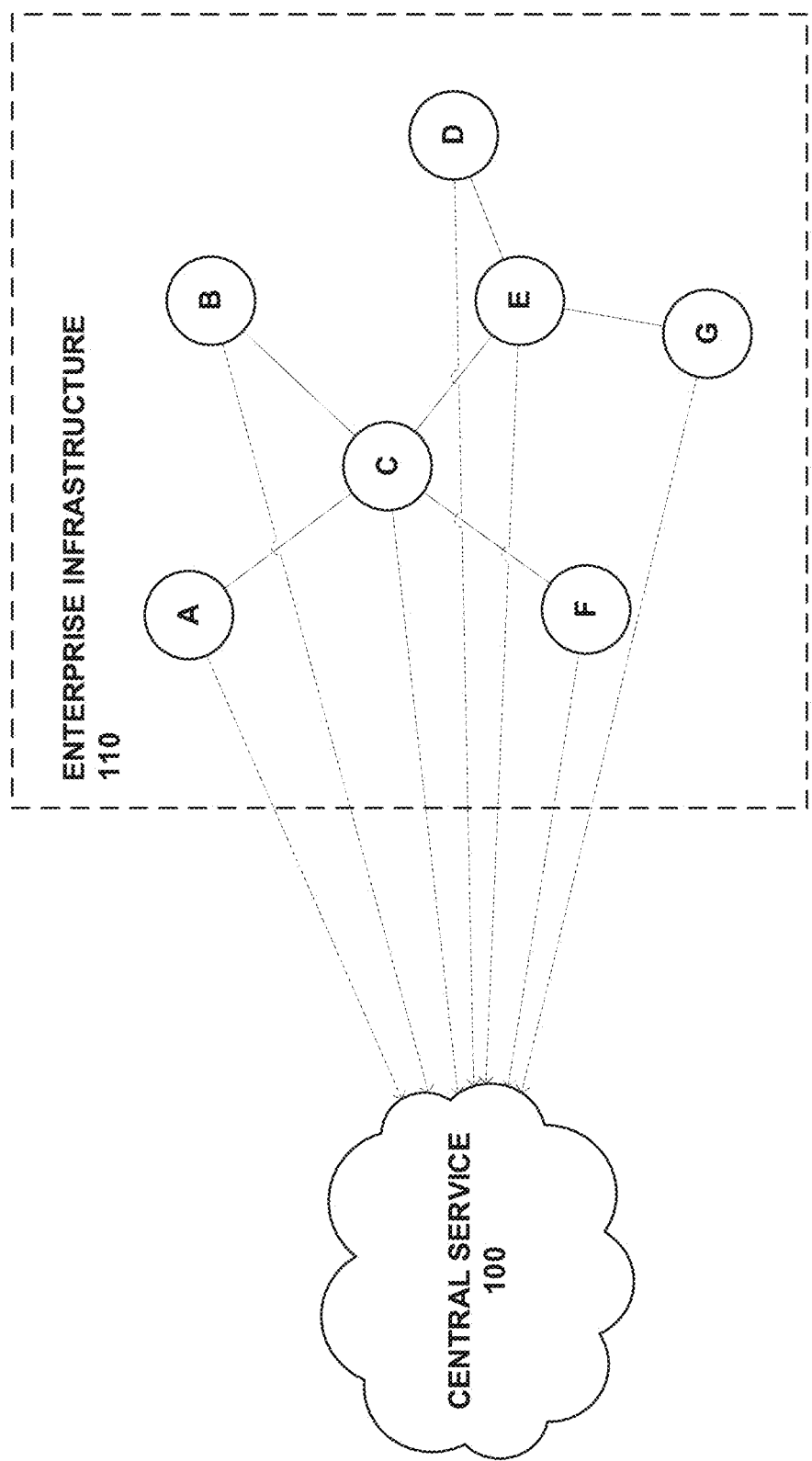
FIG. 1 depicts an example high-level system architecture for an attack progression tracking system including agents and a central service.

Described herein is a unique enterprise security solution that provides for precise interception and surgical response to attack progression, in real time, as it occurs across a distributed infrastructure, whether aggressively in seconds or minutes, or slowly and steadily over hours, days, weeks, months, or longer. The solution achieves this through a novel data monitoring and management framework that continually models system level host and network activities as mutually exclusive infrastructure wide execution sequences, and bucketizes them into unique execution trails. A multi-modal intelligent security middleware detects indicators of compromise (IoC) in real-time on top of subsets of each unique execution trail using rule based behavioral analytics, machine learning based anomaly detection, and other sources described further herein. Each such detection result dynamically contributes to aggregated risk scores at execution trail level granularities. These scores can be used to prioritize and identify highest risk attack trails to end users, along with steps that such end users can perform to mitigate further damage and progression of an attack.

In one implementation, the proposed solution incorporates the following primary features, which are described in further detail below: (1) distributed, high-volume, multi-dimensional (e.g., process, operating system, network) execution trail tracking in real time within hosts, as well as across hosts, within an infrastructure (e.g., an enterprise network); (2) determination of indicators of compromise and assignment of risk on system level entities, individual system level events, or clusters of system level events within execution trails, using behavioral anomaly based detection functions based on rule-based behavioral analytics and learned behavior from observations of user environments; (3) evaluation and iterative re-evaluation of risk of execution trails as they demonstrate multiple indicators of compromise over a timeline; and (4) concise real-time visualization of execution trails, including characterizations of the trails in terms of risk, and descriptions relating to posture, reasons for risk, and recommendations for actions to mitigate identified risks.

The techniques described herein provide numerous benefits to enterprise security. In one instance, such techniques facilitate clear visualization of the complete "storyline" of an attack progression in real-time, including its origination, movement through enterprise infrastructure, and current state. Security operations teams are then able to gauge the complete security posture of the enterprise environment. As another example benefit, the present solution eliminates the painstaking experience of top-down wading through deluges of security alerts, replacing that experience instead with real-time visualization of attack progressions, built from the bottom up. Further, the solution provides machine-based comprehension of attack progressions at fine granularity, which enables automated, surgical responses to attacks. Such responses are not only preventive to stop attack progression, but are also adaptive, such that they are able to dynamically increase scrutiny as the attack progression crosses threat thresholds. Accordingly, armed with a clear visualization of a security posture spanning an entire enterprise environment, security analysts can observe all weaknesses that an attack has taken advantage of, and use this information to bolster defenses in a meaningful way.

As used herein, these terms have the following meanings, except where context dictates otherwise.

"Agent" or sensor" refers to a privileged process executing on a host (or virtual machine) that instruments system level activities (set of events) generated by an operating system or other software on the host (or virtual machine).

"Hub" or "central service" refers to a centralized processing system, service, or cluster which is a consolidation point for events and other information generated and collected by the agents.

"Execution graph" refers to a directed graph, generated by an agent and/or the hub, comprising nodes (vertices) that represent entities, and edges connecting nodes in the graph, where the edges represent events or actions that are associated with one or more of the nodes to which the edges are connected. Edges can represent relationships between two entities, e.g., two processes, a process and a file, a process and a network socket, a process and a registry, and so on. An execution graph can be a "local" execution graph (i.e., associated with the events or actions on a particular system monitored by an agent) or a "global" or "distributed" execution graph (i.e., associated with the events or actions on multiple systems monitored by multiple agents).

"Entity" refers to a process or an artifact (e.g., file, directory, registry, socket, pipe, character device, block device, or other type).

"Event" or "action" refers to a system level or application level event or action that can be associated with an entity, and can include events such as create directory, open file, modify data in a file, delete a file, copy data in a file, execute process, connect on a socket, accept connection on a socket, fork process, create thread, execute thread, start/stop thread, send/receive data through socket or device, and so on.

"System events" or "system level activities" and variations thereof refer to events that are generated by an operating system at a host, including, but not limited to, system calls.

"Execution trail" or "progression" refers to a partition or subgraph of an execution graph, typically isolated by a single intent or a single unit of work. For example, an execution trail can be a partitioned graph representing a single SSH session, or a set of activities that is performed for a single database connection. An execution trail can be, for example, a "local" execution trail that is a partition or subgraph of a local execution graph, or a "global" or "distributed" execution trail that is a partition or subgraph of a global execution graph.

"Attacker" refers to an actor (e.g., a hacker, team of individuals, software program, etc.) with the intent or appearance of intent to perform unauthorized or malicious activities. Such attackers may infiltrate an enterprise infrastructure, secretly navigate a network, and access or harm critical assets.

System Architecture

In one implementation, a deterministic system facilitates observing and addressing security problems with powerful, real-time, structured data. The system generates execution graphs by deploying agents across an enterprise infrastructure. Each agent instruments the local system events generated from the host and converts them to graph vertices and edges that are then consumed by a central processing cluster, or hub. Using the relationships and attributes of the execution graph, the central processing cluster can effectively extract meaningful security contexts from events occurring across the infrastructure.

FIG. 1 depicts one implementation of the foregoing system, which includes two primary components: a central service 100 and a distributed fabric of agents (sensors) A-G deployed on guest operating systems across an enterprise infrastructure 110. For purposes of illustration, the enterprise infrastructure 110 includes seven agents A-G connected in a network (depicted by solid lines). However, one will appreciate that an enterprise infrastructure can include tens, hundreds, or thousands of computing systems (desktops, laptops, mobile devices, etc.) connected by local area networks, wide area networks, and other communication methods. The agents A-G also communicate using such methods with central service 100 (depicted by dotted lines). Central service 100 can be situated inside or outside of the enterprise infrastructure 110.

Figure 2:
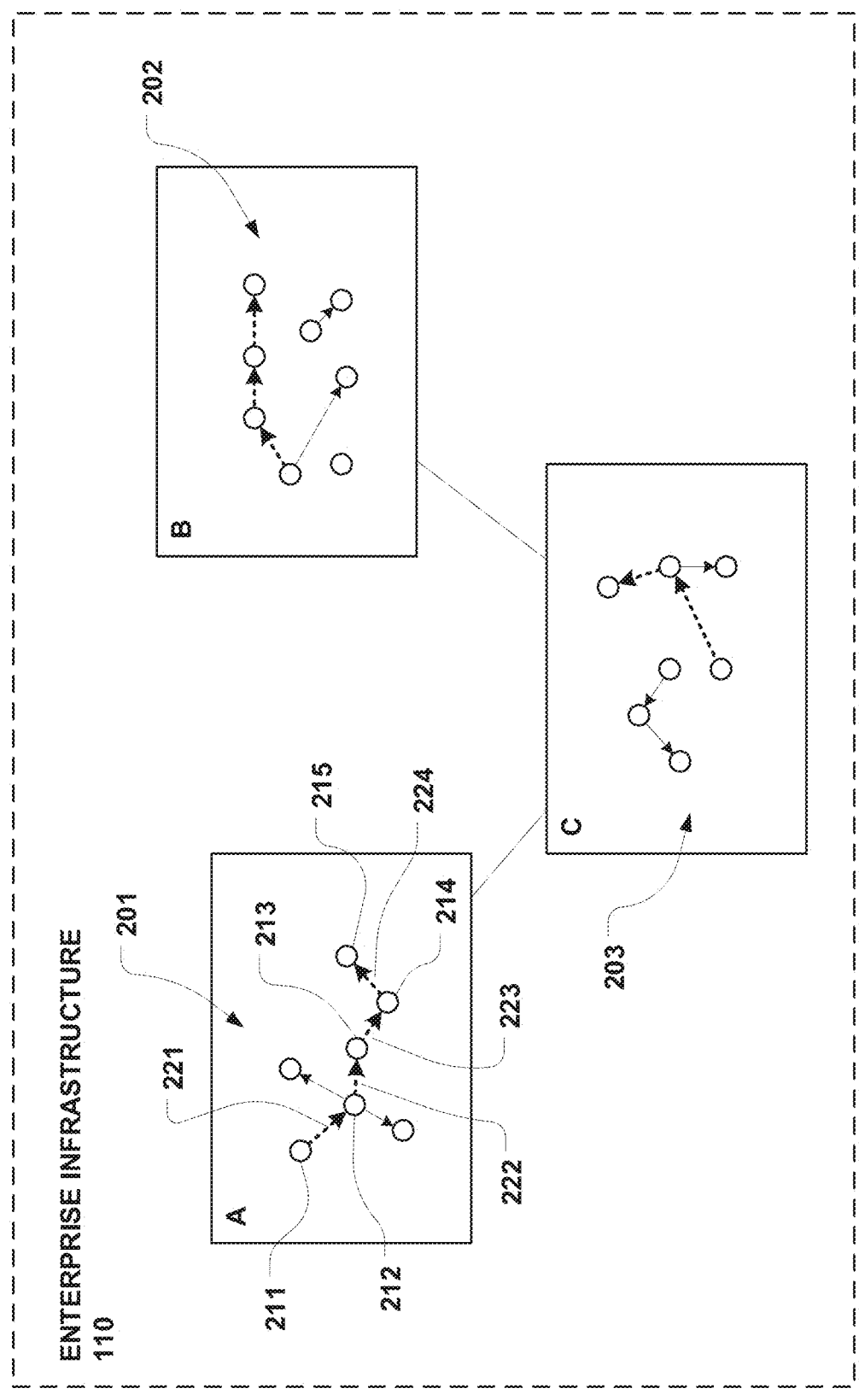
FIG. 2 depicts an example of local execution graphs created by agents executing on hosts in an enterprise infrastructure.

Each agent A-G monitors system level activities in terms of entities and events (e.g., operating system processes, files, network connections, system calls, and so on) and creates, based on the system level activities, an execution graph local to the operating system on which the agent executes. For purposes of illustration, FIG. 2 depicts simplified local execution graphs 201, 202, 203 respectively created by agents A-C within enterprise infrastructure 110. Local execution graph 201, for example, includes a local execution trail (represented by a bold dashed line), which includes nodes 211, 212, 213, 214, and 215, connected by edges 221, 222, 223, and 224. Other local execution trails are similarly represented by bold dashed lines within local execution graphs 202 and 203 created by agents B and C, respectively.

Figure 3:
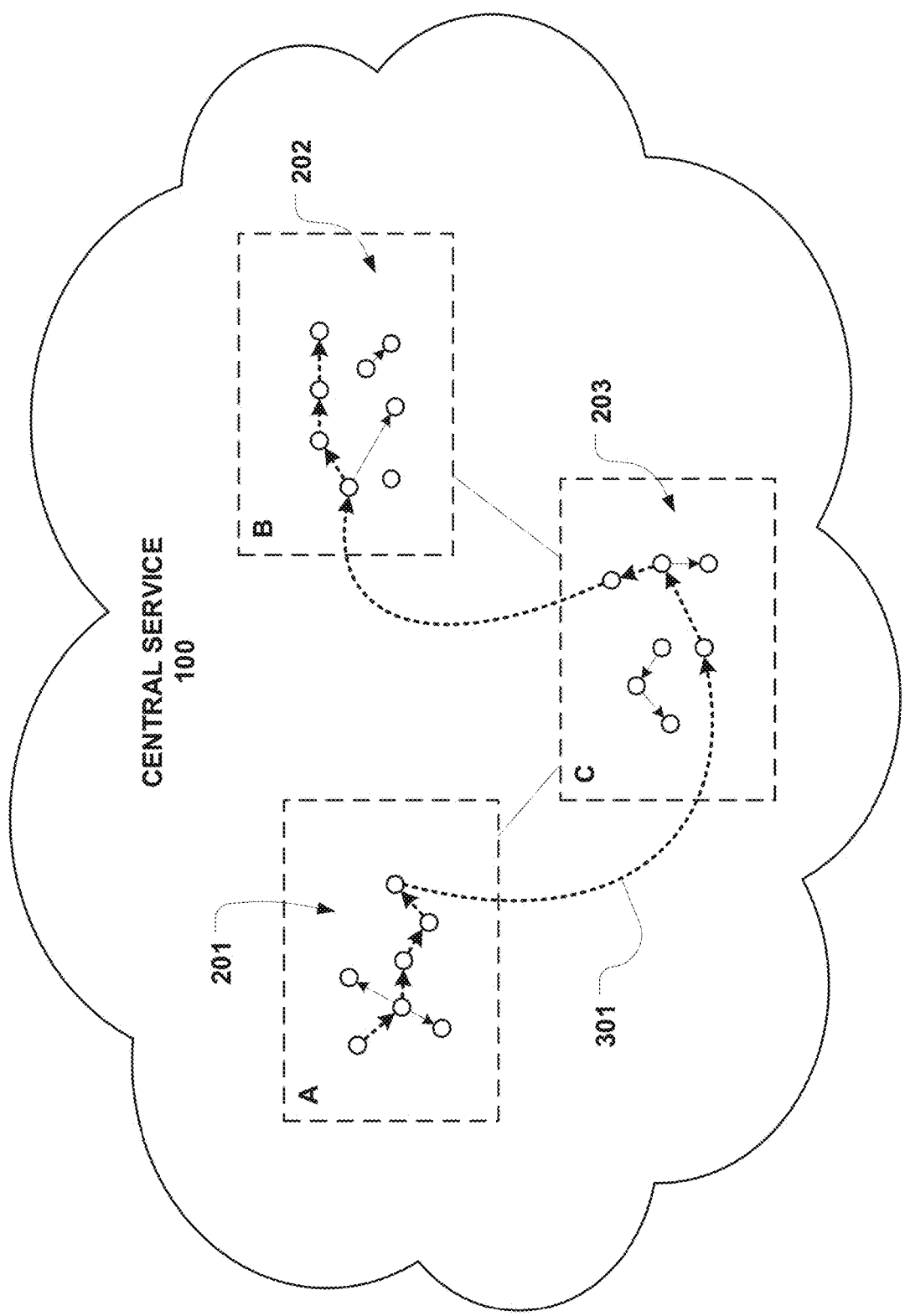
FIG. 3 depicts the local execution graphs of FIG. 2 connected at a central service to form a global execution graph.

The local execution graphs created by the agents A-G are sent to the central service 100 (e.g., using a publisher-subscriber framework, where a particular agent publishes its local execution graph or updates thereto to the subscribing central service 100). In some instances, the local execution graphs are compacted and/or filtered prior to being sent to the central service 100. The central service consumes local execution graphs from a multitude of agents (such as agents A-G), performs in-memory processing of such graphs to determine indicators of compromise, and persists them in an online data store. Such data store can be, for example, a distributed flexible schema online data store. As and when chains of execution perform lateral movement between multiple operating systems, the central service 100 performs stateful unification of graphs originating from individual agents to achieve infrastructure wide execution trail continuation. The central service 100 can also include an application programming interface (API) server that communicates risk information associated with execution trails (e.g., risk scores for execution trails at various granularities). FIG. 3 depicts local execution graphs 201, 202, and 203 from FIG. 2, following their receipt at the central service 100 and merger into a global execution graph. In this example, the local execution trails depicted in bold dashed lines in local execution graphs 201, 202, 203 are determined to be related and, thus, as part of the merger of the graphs 201, 202, 203, the local execution trails are connected into a continuous global execution trail 301 spanning across multiple operating systems in the infrastructure.

Figure 4:
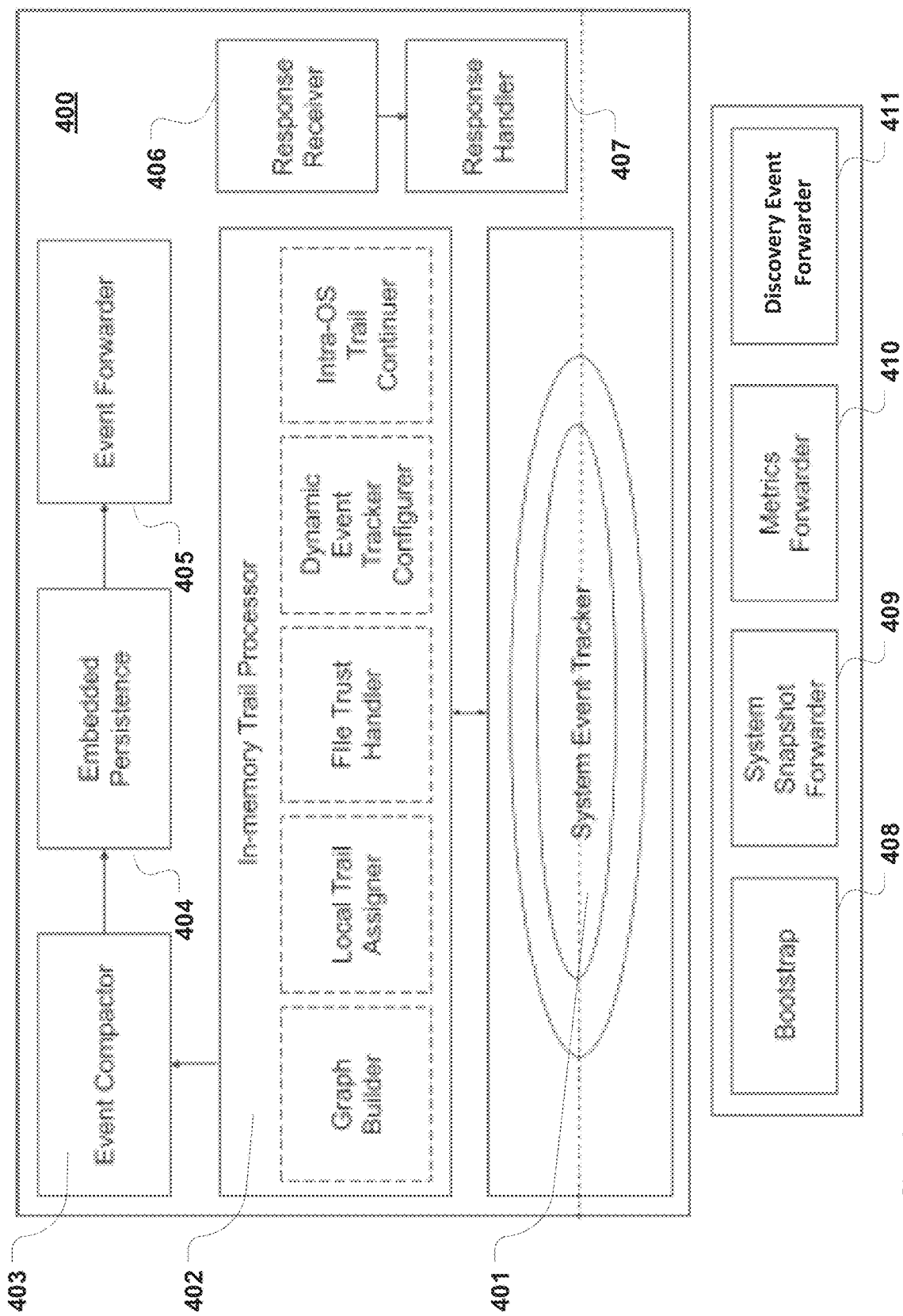
FIG. 4 depicts one implementation of an agent architecture in an attack progression tracking system

FIG. 4 depicts an example architecture of an agent 400, according to one implementation, in which a modular approach is taken to allow for the enabling and disabling of granular features on different environments. The modules of the agent 400 will now be described.

System Event Tracker 401 is responsible for monitoring systems entities, such as processes, local files, network files, and network sockets, and events, such as process creation, execution, artifact manipulation, and so on, from the host operating system. In the case of the Linux operating system, for example, events are tracked via an engineered, high-performance, lightweight, scaled-up kernel module that produces relevant system call activities in kernel ring buffers that are shared with user space consumers. The kernel module has the capability to filter and aggregate system calls based on static configurations, as well as dynamic configurations, communicated from other agent user space components.

In-memory Trail Processor 402 performs numerous functions in user space while maintaining memory footprint constraints on the host, including consuming events from System Event Tracker 401, assigning unique local trail identifiers to the consumed events, and building entity relationships from the consumed events. The relationships are built into a graph, where local trail nodes can represent processes and artifacts (e.g., files, directories, network sockets, character devices, etc.) and local trail edges can represent events (e.g., process triggered by process (fork, execve, exit); artifact generated by process (e.g., connect, open/O_CREATE); process uses artifact (e.g., accept, open, load)). The In-memory Trail Processor 402 can further perform file trust computation, dynamic reconfiguration of the System Event Tracker 401, and connecting execution graphs to identify intra-host trail continuation. Such trail continuation can include direct continuation due to intra-host process communication, as well as indirect setting membership of intra-host trails based on file/directory manipulation (e.g., a process in trail A uses a file generated by trail B).

Event Compactor 403 is an in-memory graph compactor that assists in reducing the volume of graph events that are forwarded to the central service 100. The Event Compactor 403, along with the System Event Tracker 401, is responsible for event flow control from the agent 400. Embedded Persistence 404 assists with faster recovery of In-memory Trail Processor 402 on user space failures, maintaining constraints of storage footprint on the host. Event Forwarder 405 forwards events transactionally in a monotonically increasing sequence from In-memory Trail Processor 402 to central service 100 through a publisher/subscriber broker. Response Receiver 406 receives response events from the central service 100, and Response Handler 407 addresses such response events.

In addition to the foregoing primary components, agent 400 includes auxiliary components including Bootstrap 408, which bootstraps the agent 400 after deployment and/or recovery, as well as collects an initial snapshot of the host system state to assist in local trail identifier assignments. System Snapshot Forwarder 409 periodically forwards system snapshots to the central service 100 to identify live entities in (distributed) execution trails. Metrics Forwarder 410 periodically forwards agent metrics to the central service 100 to demonstrate agent resource consumption to end users. Discovery Event Forwarder 411 forwards a heartbeat to the central service 100 to assist in agent discovery, failure detection, and recovery.

Figure 5:
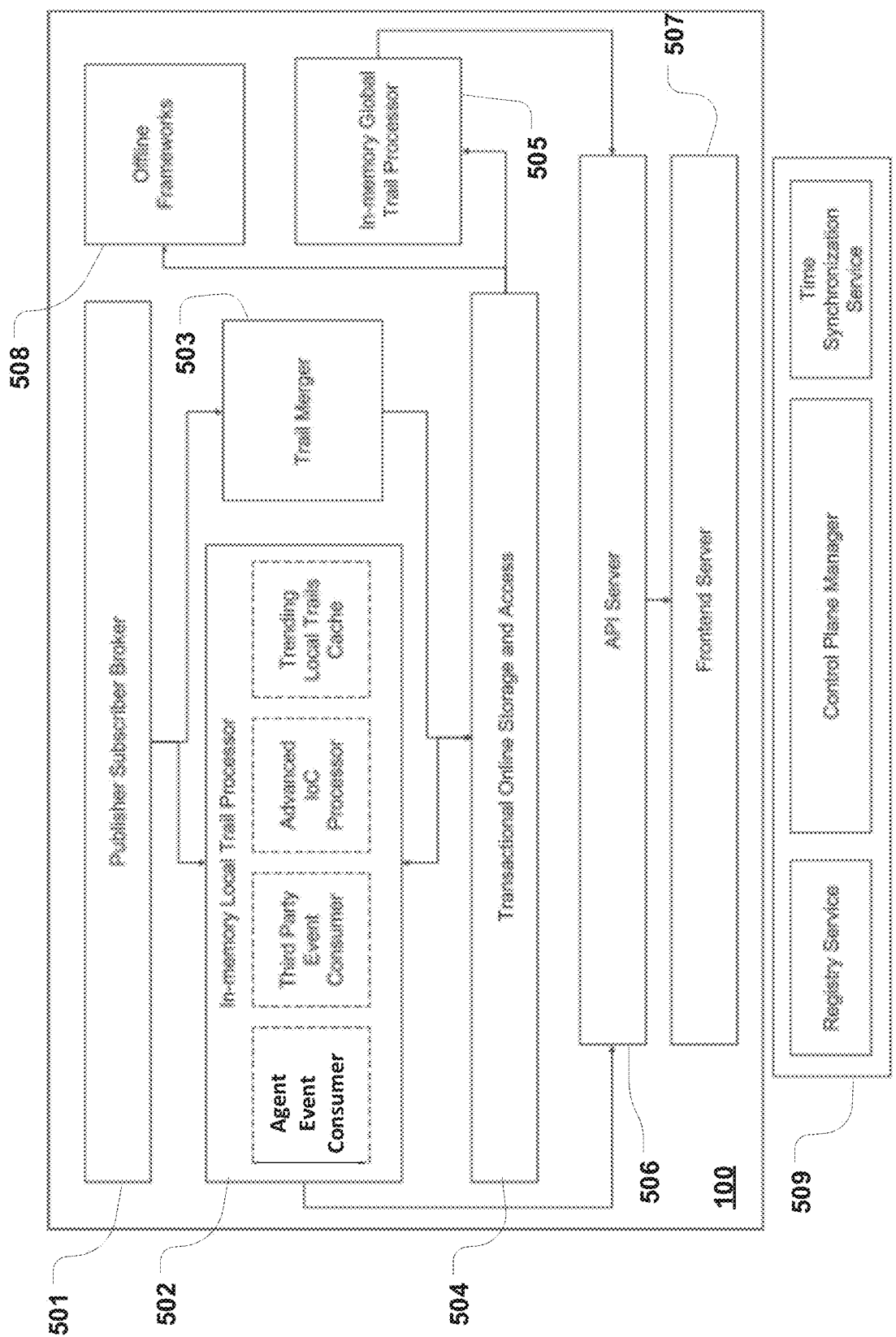
FIG. 5 depicts one implementation of a central service architecture in an attack progression tracking system.

FIG. 5 depicts an example architecture of the central service 100. In one implementation, unlike agent modules that are deployed on host/guest operating systems, central service 100 modules are scoped inside a software managed service. The central service 100 includes primarily online modules, as well as offline frameworks. The online modules of the central service 100 will now be described.

Publisher/Subscriber Broker 501 provides horizontally scalable persistent logging of execution trail events published from agents and third-party solutions that forward events tagged with host operating system information. In-memory Local Trail Processor 502 is a horizontally scalable in-memory component that is responsible for the consumption of local trail events that are associated with individual agents and received via the Publisher/Subscriber Broker 501. In-memory Local Trail Processor 502 also consumes third party solution events, which are applied to local trails. In-memory Local Trail Processor 502 further includes an in-memory local trail deep processor subcomponent with advanced IoC processing, in which complex behavior detection functions are used to determine IoCs at multi-depth sub-local trail levels. Such deep processing also includes sub-partitioning of local trails to assist in lightweight visualizations, risk scoring of IoC subpartitions, and re-scoring of local trails as needed. In addition, In-memory Local Trail Processor 502 includes a trending trails cache that serves a set of local trail data (e.g., for top N local trails) in multiple formats, as needed for front end data visualization.

Trail Merger 503 performs stateful unification of local trails across multiple agents to form global trails. This can include the explicit continuation of trails (to form global trails) based on scenarios of inter-host operating system process communication and scenarios of inter-host operating system manipulation of artifacts (e.g., process in <"host": "B", "local trail":"123"> uses a network shared file that is part of <"host":"A", "local trail":"237">). Trail Merger 503 assigns unique identifiers to global trails and assigns membership to the underlying local trails.

Transactional Storage and Access Layer 504 is a horizontally-scalable, consistent, transactional, replicated source of truth for local and global execution trails, provision for flexible schema, flexible indexing, low latency Create/Read/Update operations, time to live semantics, and time range partitioning. In-memory Global Trail Processor 505 uses change data captured from underlying transactional storage to rescore global trails when their underlying local trails are rescored. This module is responsible for forwarding responses to agents on affected hosts, and also maintains a (horizontally-scalable) retain-best cache for a set of global trails (e.g., top N trails). API Server 506 follows a pull model to periodically retrieve hierarchical representations of the set of top N trails (self-contained local trails as well as underlying local trails forming global trails). API Server 506 also serves as a spectator of the cache and storage layer control plane. Frontend Server 507 provides a user-facing web application that provides the visualization functionality described herein.

Central service 100 further includes Offline Frameworks 508, including a behavioral model builder, which ingests incremental snapshots of trail edges from a storage engine and creates probabilistic n-gram models of intra-host process executions, local and network file manipulations, intra- and cross-host process connections. This framework supports API parallelization as well as horizontal scalability. Offline Frameworks 508 further include search and offline reports components to support search and reporting APIs, if required. This framework supports API parallelization as well as horizontal scalability.

Auxiliary Modules 509 in the central service 100 include a Registry Service that serves as a source of truth configuration store for global and local execution trail schemas, static IoC functions, and learned IoC behavioral models; a Control Plane Manager that provides automatic assignment of in-memory processors across multiple servers, agent failure detection and recovery, dynamic addition of new agents, and bootstrapping of in-memory processors; and a third party Time Synchronization Service that provides consistent and accurate time references to a distributed transactional storage and access layer, if required.

Connection Tracing

Because attacks progress gradually across multiple systems, it is difficult to map which security violations are related on distributed infrastructure. Whereas human analysts would normally manually stitch risk signals together through a labor-intensive process, the presently described attack progression tracking system facilitates the identification of connected events.

In modern systems, a process often communicates with another process via connection-oriented protocols. This involves (1) an initiator creating a connection and (2) a listener accepting the request. Once a connection is established, the two processes can send and/or receive data between them. An example of this is the TCP connection protocol. One powerful way to monitor an attacker's movement across infrastructure is to closely follow the connections between processes. In other words, the connections between processes can be identified, it is possible to determine how the attacker has advanced through the infrastructure.

Agents match connecting processes by instrumenting connect and accept system calls on an operating system. These events are represented in an execution graph as edges. Such edges are referred to herein as "atomic" edges, because there is a one-to-one mapping between a system call and an edge. Agents are able to follow two kinds of connections: local and network. Using a TCP network connection as an example, an agent from host A instruments a connect system call from process X, producing a mapping:

X→<senderIP:senderPort,receiverIP:receiverPort>

The agent from host B instruments an accept system call from process Y, producing a mapping:

Y→<senderIP:senderPort,receiverIP:receiverPort>

The central service, upon receiving events from both agents A and B, determines that there is a matching relationship between the connect and accept calls, and records the connection mapping between X→Y.

Now, using a Unix domain socket local host connection as an example, an agent from host A instruments a connect system call from process X, producing a mapping:

X→<socket path, kaddr sender struct, kaddr receiver struct>

Here, kaddr refers to the kernel address of the internal address struct, each unique per sender and receiver at the time of connection. The agent from the same host A instruments an accept system call from process Y, producing a mapping:

Y→<socket path, kaddr sender struct, kaddr receiver struct>

The central service, upon receiving both events from agent A, determines that there is a matching relationship between the connect and accept calls, and records the connection mapping between X→Y.

Figure 6:
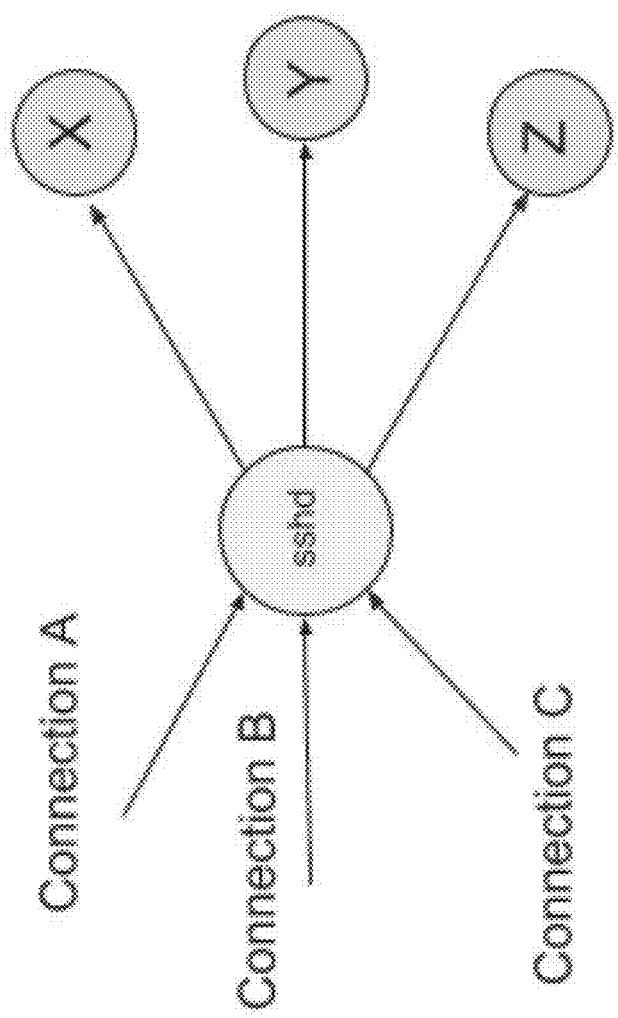
FIG. 6 depicts example connection multiplexing and resulting processes.

Many network-facing processes follow the pattern of operating as a server. A server process accepts many connections simultaneously and performs actions that are requested by the clients. In this particular case, there is a multiplexing relationship between incoming connections and their subsequent actions. As shown in FIG. 6, a secure shell daemon (sshd) accepts three independent connections (connections A, B, and C), and opens three individual sessions (processes X, Y, and Z). Without further information, an agent cannot determine exactly which incoming connections cause which actions (processes). The agent addresses this problem by using "implied" edges. Implied edges are different from atomic edges, in that they are produced after observing a certain number N of system events. Agents are configured with state machines that are advanced as matching events are observed at different stages. When a state machine reaches a terminal state, an implied edge is produced. If the state machine does not terminate by a certain number M of events, the tracked state is discarded.

There are two implied edge types that are produced by agents: hands-off implied edges and session-for implied edges. A hands-off implied edge is produced when an agent observes that a parent process clones a child process with an intent to handing over a network socket that it received. More specifically, an agent looks for the following behaviors using its state machine:

1) Parent process accepts a connection,
2) As a result of the accept ( ) the parent process obtains a file descriptor.
3) Parent process forks a child process.
4) The file descriptor from the parent is closed, leaving only the duplicate file descriptor of the child accessible.

A session-for implied edge is produced when an agent observes a worker thread taking over a network socket that has been received by another thread (typically, the main thread). More specifically, an agent looks for the following behaviors using its state machine:

1) The main thread from a server accepts a connection and obtains a file descriptor.
2) One of the worker threads from the same process starts read ( ) or recvfrom ( ) (or analogous functions) on the file descriptor.

To summarize, using the foregoing techniques, agents can identify relationships between processes initiating connections and subsequent processes instantiated through multiplexing servers by instrumenting which process or thread is handed an existing network socket.

The central service can consume the atomic and the implied edges to create a trail that tracks the movement of an attacker, which is, in essence, a subset of all the connections that are occurring between processes. The central service has an efficient logic which follows a state transition, as well. By employing both of the techniques above, it can advance the following state machine:

1) Wait for a connect ( ) or accept ( ) record event (e.g., in hash table).
2) Wait for matching connect ( ) or accept ( )
3) If the proximity of the timestamps of the events is within a threshold, record as a match between sender and receiver.
4) Optionally, wait for an additional implied edge.
5) If the implied edge arrives within a threshold amount of time, record as a match between a sender and a subsequent action.

Execution Trail Identification

Figure 7:
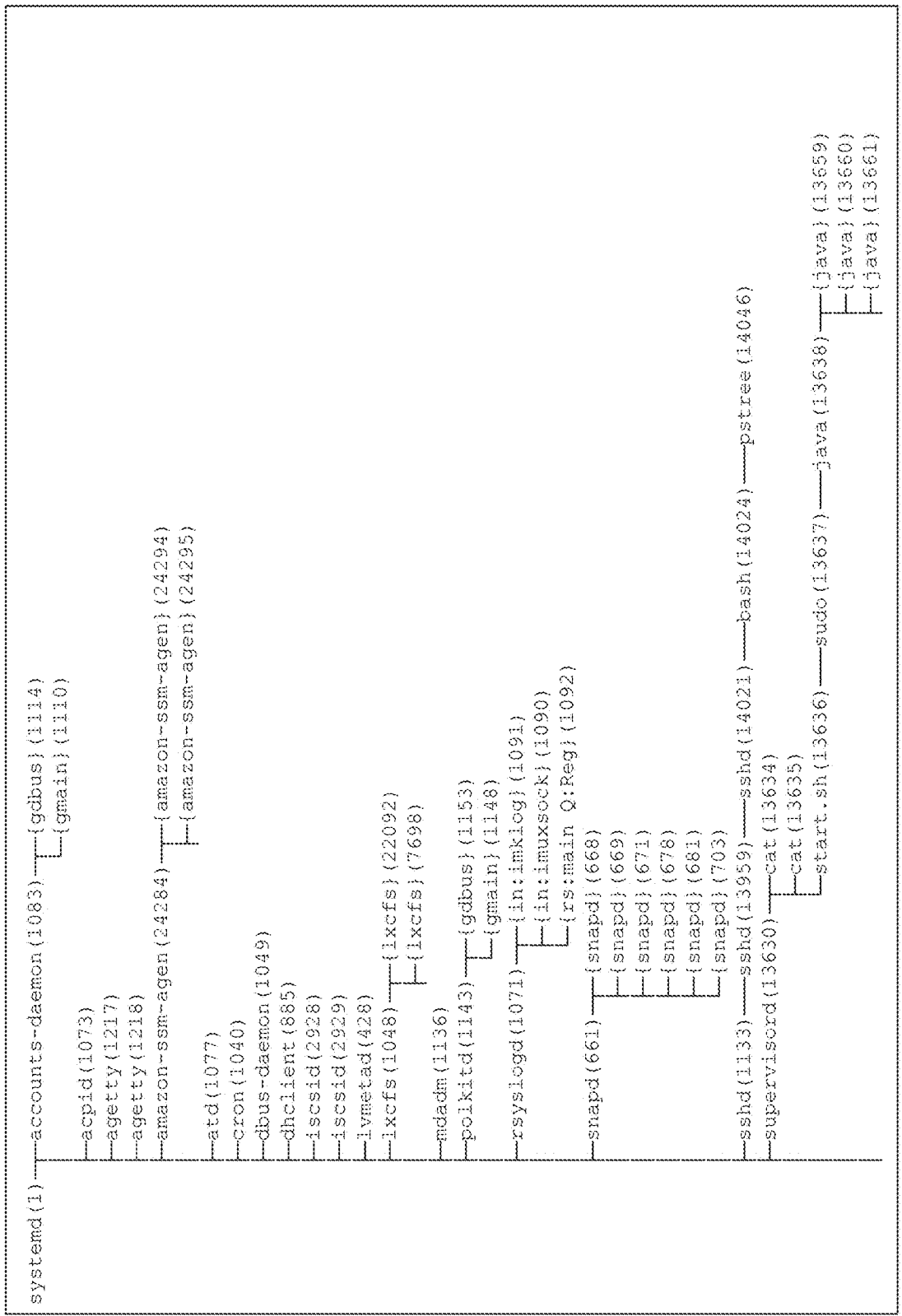
FIG. 7 depicts an example process tree dump on a Linux operating system.

The execution graphs each agent produces can be extensive in depth and width, considering they track events for a multitude of processes executing on an operating system. To emphasize this, FIG. 7 depicts a process tree dump for a single Linux host. An agent operating on such a host would instrument the system calls associated with the numerous processes. Further still, there are usually multiple daemons servicing different requests throughout the lifecycle of a system.

A large execution graph is difficult to process for two reasons. First, the virtually unbounded number of vertices and edges prevents efficient pattern matching. Second, grouping functionally unrelated tasks together may produce false signals during security analysis. To process the execution graph more effectively, the present system partitions the graph into one or more execution trails. In some implementations, the graph is partitioned such that each execution trail (subgraph) represents a single intent or a single unit of work. An "intent" can be a particular purpose, for example, starting a file transfer protocol (FTP) session to download a file, or applying a set of firewall rules. A "unit of work" can be a particular action, such as a executing a scheduled task, or executing a process in response to a request.

Figure 8:
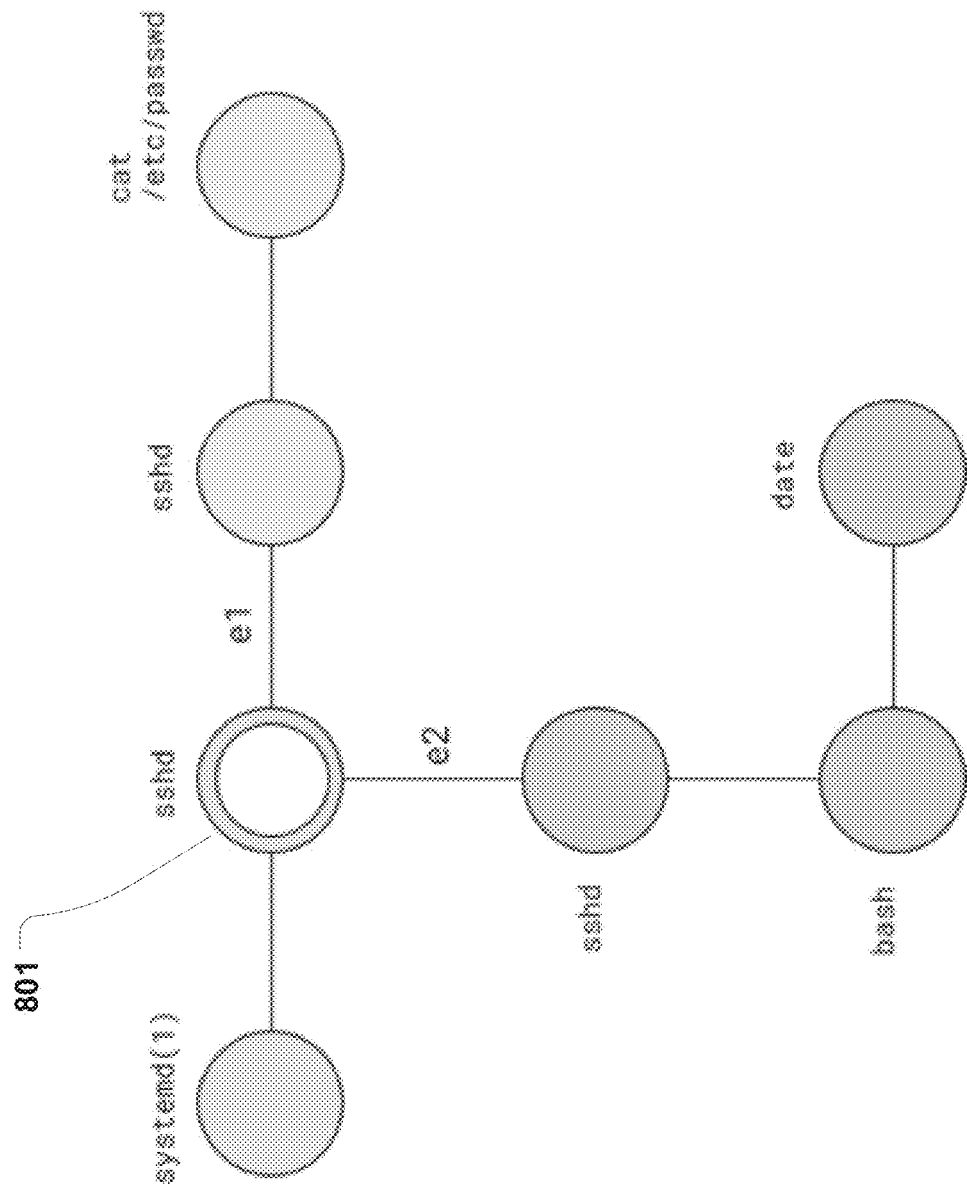
FIG. 8 depicts an example of partitioning an execution graph.

"Apex points" are used to delineate separate, independent partitions in an execution graph. Because process relationships are hierarchical in nature, a convergence point can be defined in the graph such that any subtree formed afterward is considered a separate independent partition (trail). As such, an Apex point is, in essence, a breaking point in an execution graph. FIG. 8 provides an example of this concept, in which a secure shell daemon (sshd) 801 services two sessions e1 and e2. Session e1 is reading the /etc/passwd file, whereas the other session e2 is checking the current date and time. There is a high chance that these two sessions belong to different individuals with independent intents. The same logic applies for subsequent sessions created by the sshd 801.

A process is determined to be an Apex point if it produces sub-graphs that are independent of each other. In one implementation, the following rules are used to determine whether an Apex point exists: (1) the process is owned directly by the initialization process for the operating system (e.g., the "init" process); or (2) the process has accepted a connection (e.g., the process has called accept ( ) on a socket (TCP, UDP, Unix domain, etc.)). If a process meets one of the foregoing qualification rules, it is likely to be servicing an external request. Heuristically speaking, it is highly that such processes would produce subgraphs with different intents (e.g., independent actions caused by different requests).

Risk Scoring

Figure 9:
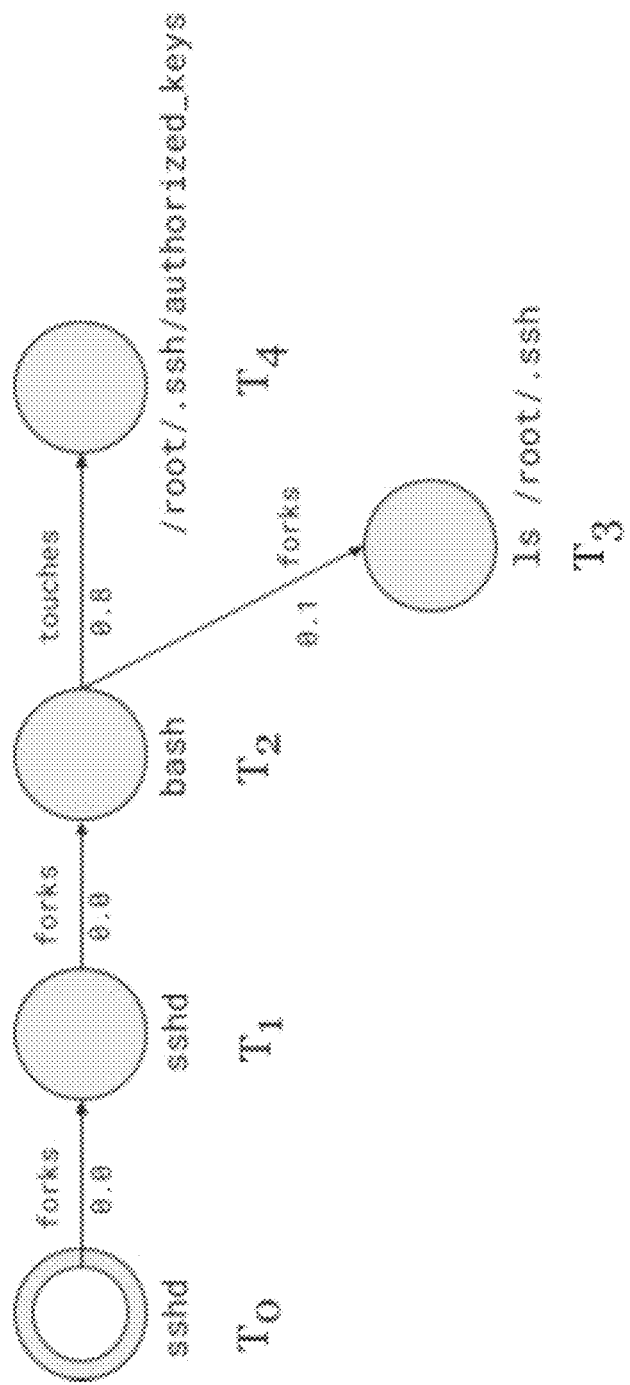
FIG. 9 depicts an example of risking scoring an execution trail.

After the execution graphs are partitioned as individual trails, security risks associated with each subgraph can be identified. Risk identification can be performed by the central service and/or individual agents. FIG. 9 is an execution graph mapping a sequence of action for a particular trail happening across times $T_0$ to $T_4$. At $T_0$, sshd forks a new sshd session process, which, at $T_1$, forks a shell process (bash). At $T_3$, a directory listing command (ls) is executed in the shell. At $T_4$, the/root/.ssh/authorized_keys file is accessed. The central service processes the vertices and edges of the execution graph and can identify malicious activities on four different dimensions: (1) frequency: is something repeated over a threshold number of times?; (2) edge: does a single edge match a behavior associated with risk?; (3) path: does a path in the graph match a behavior associated with risk?; and (4) cluster: does a cluster (subtree) in the graph contain elements associated with risk?

Risks can be identified using predefined sets of rules, heuristics, machine learning, or other techniques. Identified risky behavior (e.g., behavior that matches a particular rule, or is similar to a learned malicious behavior) can have an associated risk score, with behaviors that are more suspicious or more likely to malicious having higher risk scores than activities that may be relatively benign. In one implementation, rules provided as input to the system are sets of one or more conditional expressions that express system level behaviors based on operating system call event parameters. These conditions can be parsed into abstract syntax trees. In some instances, when the conditions of a rule are satisfied, the matching behavior is marked as an IoC, and the score associated with the rule is applied to the marked behavior. The score can be a predefined value (see examples below). The score can be defined by a category (e.g., low risk, medium risk, high risk), with higher risk categories having higher associated risk scores.

The rules can be structured in a manner that analyzes system level activities on one or more of the above dimensions. For example, a frequency rule can include a single conditional expression that expresses a source process invoking a certain event multiple times aggregated within a single time bucket and observed across a window comprising multiple time buckets. As graph events are received at the central service from individual agents, frequencies of events matching the expressions can be cached and analyzed online. Another example is an event (edge) rule, which can include a single conditional expression that expresses an event between two entities, such as process/thread manipulating process, process/thread manipulating file, process/thread manipulating network addresses, and so on. As graph events are streamed from individual sensors to the central service, each event can be subjected to such event rules for condition match within time buckets. As a further example, a path rule includes multiple conditional expressions with the intent that a subset of events taking place within a single path in a graph demonstrate the behaviors encoded in the expressions. As events are streamed into the central service, a unique algorithm can cache the prefix expressions. Whenever an end expression for the rule is matched by an event, further asynchronous analysis can be performed over all cached expressions to check whether they are on the same path of the graph. An identified path can be, for example, process A executing process B, process C executing process D, and so on. Another example is a cluster rule, which includes multiple conditional expressions with the intent that a subset of events taking place across different paths in a graph demonstrates the behaviors encoded in the expressions. Lowest common ancestors can be determined across the events matching the expressions. One of skill will appreciate the numerous ways in which risks can be identified and scored.

As risks are identified, the central service tracks the risk score at the trail level. Table 1 presents a simple example of how a risk score accumulates over time, using simple edge risks, resulting in a total risk for the execution trail of 0.9.

TABLE 1

| Time | Risk Score | Event Description |
|---|---|---|
| $T_0$ | 0.0 | Process is owned by init, likely harmless |
| $T_1$ | 0.0 | New ssh session |
| $T_2$ | 0.0 | Bash process, likely harmless |
| $T_3$ | 0.1 (+0.1) | View root/.ssh dir – potentially suspicious |
| $T_4$ | 0.9 (+0.8) | Modification of authorized_keys – potentially malicious |

In some implementations, risk scores for IoCs are accumulated to the underlying trails as follows. Certain IoCs are considered "anchor" IoCs (i.e., IoCs that are independently associated with risk), and the risk scores of such anchor IoCs are added to the underlying trail when detected. The scores of "dependent" IoCs are not added to the underlying trail if an anchor IoC has not previously been observed for the trail. A qualifying anchor IoC can be observed on the same machine or, if the trail has laterally moved, on a different machine. For example, the score of a privilege escalation function like sudo su may not get added to the corresponding trail unless the trail has seen an anchor IoC. Finally, the scores of "contextual" IoCs are not accumulated to a trail until the score of the trail has reached a particular threshold.

Global Trails

Using the connection matching techniques described above, the central service can form a larger context among multiple systems in an infrastructure. That is, the central service can piece together the connected trails to form a larger aggregated trail (i.e., a global trail). For example, referring back to FIG. 3, if a process from trail 201 (on the host associated with agent A) makes a connection to a process from trail 203 (on the host associated with agent C), the central service aggregates the two trails in a global trail 301. The risk scores from each local trail 201 and 203 (as well as 202) can be combined to form a risk score for the new global trail 301. In one implementation, the risk scores from the local trails 201, 202, and 203 are added together to form the risk score for the global trail 301. Global trails form the basis for the security insights provided by the system. By highlighting the global trails with a high-risk score, the system can alert and recommend actions to end users (e.g., security analysts).

Risk Influence Transfer

Figure 10:
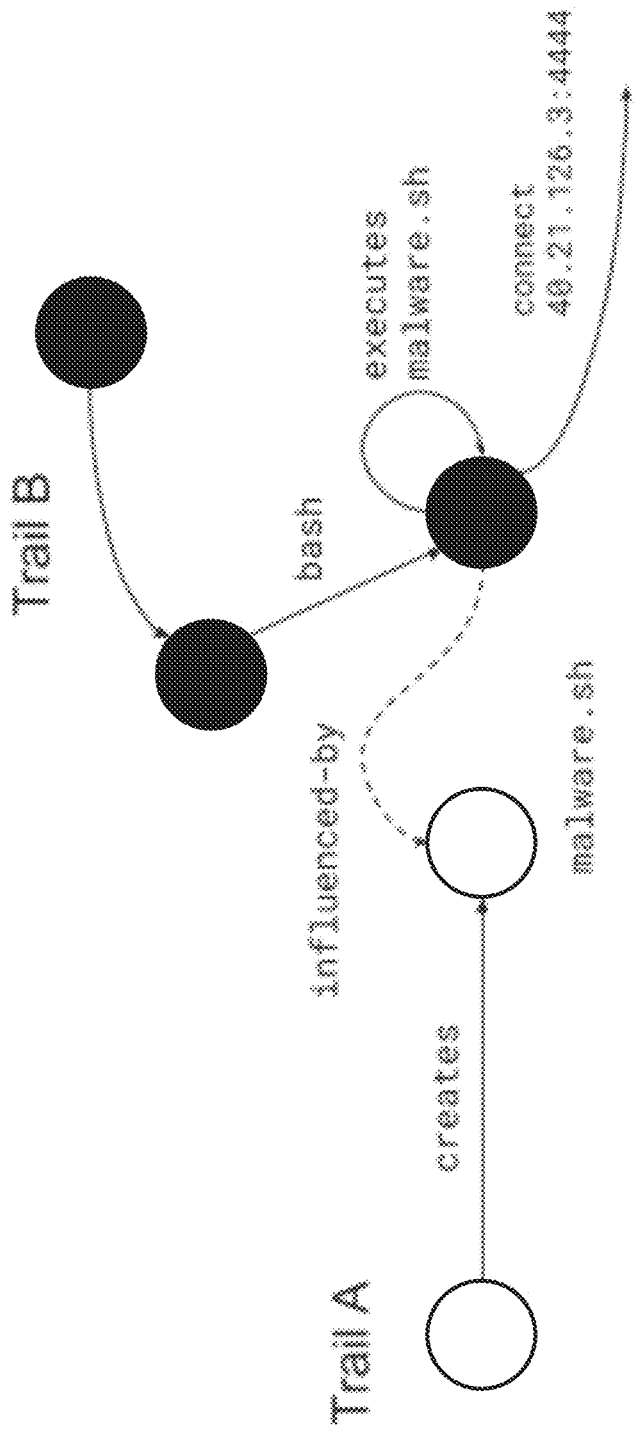
FIG. 10 depicts an example of an influence relationship between execution trails.

The partitioned trails in the execution graphs are independent in nature, but this is not to say that they do not interact with each other. On the contrary, the risk score of one trail can be affected by the "influence" of another trail. With reference to FIG. 10, consider the following example. Trail A (containing the nodes represented as circle outlines) creates a malicious script called malware.sh, and, at a later time, a different trail, Trail B (containing the nodes represented as solid black circles) executes the script. Although the two Trails A and B are independent of each other, Trail B is at least as risky as Trail A (because Trail B is using the script that Trail A has created). This is referred to herein as an "influence-by" relationship.

In one implementation, a trail is "influenced" by the risk score associated with another trail when the first trail executes or opens an artifact produced by the other trail (in some instances, opening an artifact includes accessing, modifying, copying, moving, deleting, and/or other actions taken with respect to the artifact). When the influence-by relationship is formed, the following formula is used so that the risk score of influencer is absorbed.

$$RB=(1-\alpha) \cdot RB + \alpha \cdot \text{Rinfluencer} \qquad \text{Equation 1}$$

In the above formula, RB is the risk score associated with Trail B, Rinfuencer is the risk score associated with the influencer (malware script), and α is a weighting factor between 0 and 1.0. The exact value of α can be tuned per installation and desired sensitivity. The general concept of the foregoing is to use a weighted running average (e.g., exponential averaging) to retain a certain amount of the risk score of the existing trail (here, Trail B), and absorb a certain amount of risk score from the influencer (here, malware.sh).

Two risk transfers occur in FIG. 10: (1) a transfer of risk between Trail A and a file artifact (malware.sh) during creation of the artifact, and (2) a transfer of risk between the file artifact (malware.sh) and Trail B during execution of the artifact. When an artifact (e.g., a file) is created or modified (or, in some implementations, another action is taken with respect to the artifact), the risk score of the trail is absorbed into the artifact. Each artifact maintains its own base risk score based on the creation/modification history of the artifact.

Figure 11:
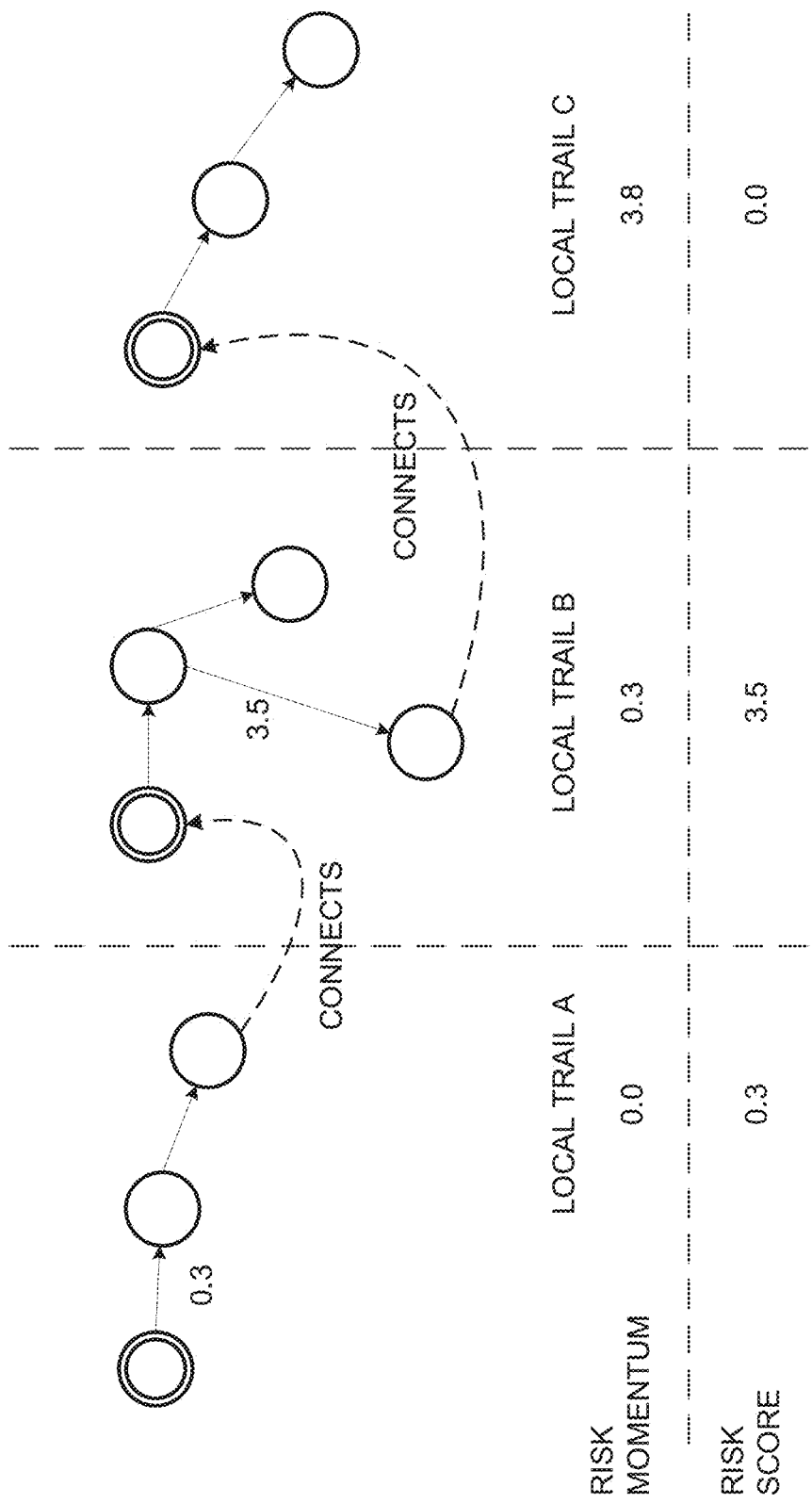
FIG. 11 depicts an example of risk momentum across multiple execution trails.

To further understand how trail risk transfer is performed, the concept of "risk momentum" will now be explained. Risk momentum is a supplemental metric that describes the risk that has accumulated thus far beyond a current local trail. In other words, it is the total combined score for the global trail. An example of risk momentum is illustrated in FIG. 11. As shown, Local Trail A, Local Trail B, and Local Trail C are connected to form a continuous global execution trail. Using the techniques described above, Local Trail A is assigned a risk score of 0.3 and Local Trail B has a risk score of 3.5. Traversing the global execution trail, the risk momentum at Local Trail B is 0.3, which is the accumulation of the risk scores of preceding trails (i.e., Local Trail A). Going further, the risk momentum at Local Trail C is 3.8, which is the accumulation of the risk scores of preceding Local Trails A and B.

It is possible that a local execution trail does not exhibit any risky behavior, but its preceding trails have accumulated substantial risky behaviors. In that situation, the local execution trail has a low (or zero) risk score but has a high momentum. For example, referring back to FIG. 11, Local Trail C has a risk score of zero, but has a risk momentum of 3.8. For this reason, both the risk momentum and risk score are considered when transferring risk to an artifact. In one implementation, risk is transferred to an artifact using the following formula:

$$\text{ArtifactBase}=(\text{RiskMomentum}+\text{RiskScore}) \cdot \beta \qquad \text{Equation 2}$$

That is, the base risk score for an artifact (ArtifactBase) is calculated by multiplying a constant β to the sum of the current risk momentum (RiskMomentum) and risk score of the current execution trail (RiskScore). β is a weighting factor, typically between 0.0 and 1.0. Using the above equation, a local execution trail may not exhibit risky behavior as a given moment, but such trail can still produce a non-zero artifact base score in the risk momentum is non-zero.

A trail that then accesses or executes an artifact is influenced by the base score of the artifact, per Equation 1, above (Rinfluencer is the artifact base score). Accordingly, although trails are partitioned in nature, risk scores are absorbed and transferred to each other through influence-by relationships, which results in the system providing an accurate and useful depiction of how risk behaviors propagate through infrastructure.

Policy Framework Based on Graph Edge Context

Using the techniques described herein, both behaviors and intents can be reflected by execution trails of an execution graph and exposed to a user in a distributed environment, which may allow the user to control and act on the execution graph based on policies specific to the user's environment. A behavior can represent an activity performed by an actor (e.g., an attacker). The execution graph can be constructed by a central service or hub based on activities monitored by multiple agents deployed on multiple hosts or operating systems. An intent can represent a result inferred from a string of behavioral patterns obtained in association with the actor. A user can be a client user or enterprise user who accesses or manages a host deployed with one of the multiple agents, for example, a security analyst. In one implementation, the user can operate on the execution graph to identify which behavior associated with an execution trail of the execution graph is benign or malicious and trigger an appropriate action (e.g., block, quarantine) that can be taken to mitigate security risks based on one or more policies defined for the user's environment (e.g., an enterprise).

As described herein, by (1) tracking and mapping the infrastructure as a set of continuously distributed execution trails and graphs of application and system level activities, (2) fusing security detection results on the execution graphs to continuously rank and re-rank such graphs to intercept malicious progressions as they happen, and (3) tracking inter-process communication based lateral movements and performing a distributed union of server-local subgraphs to capture progression continuation, the present solution is able to capture the behavioral relationships between entities (e.g., host, network, interface, process) and obtain the functional context that maps to the behaviors that an organization or enterprise wants to monitor and police. The functional context can include an intent of host, an intent of network, an intent of interface, or an intent of process, etc. Based on such functional context, the user control on the entities (e.g., nodes of the execution graph), and more importantly, on the behaviors of the entities in their environment (e.g., edges of the execution graph), can be performed.

Policy frameworks, for managing and restricting enterprise network and workload infrastructure, are present in existing endpoint detection and response (EDR) products and security orchestration, automation and response (SOAR) products. However, these frameworks only act on nodes as standalone entities, and, therefore, cannot scale or adapt to the enterprise infrastructure moving to a de-centralized (e.g., cloud-based) environment where the significance of entities has diminished and turned ephemeral. Compared to the existing policy frameworks, the present solution can expose behavior metrics/functional context to users and add the user control on behaviors of the entities (rather than only on the entities), and thus provide an extra layer of management to effectively and efficiently solve the problem of policing the evolving enterprise infrastructure.

Figure 12A:
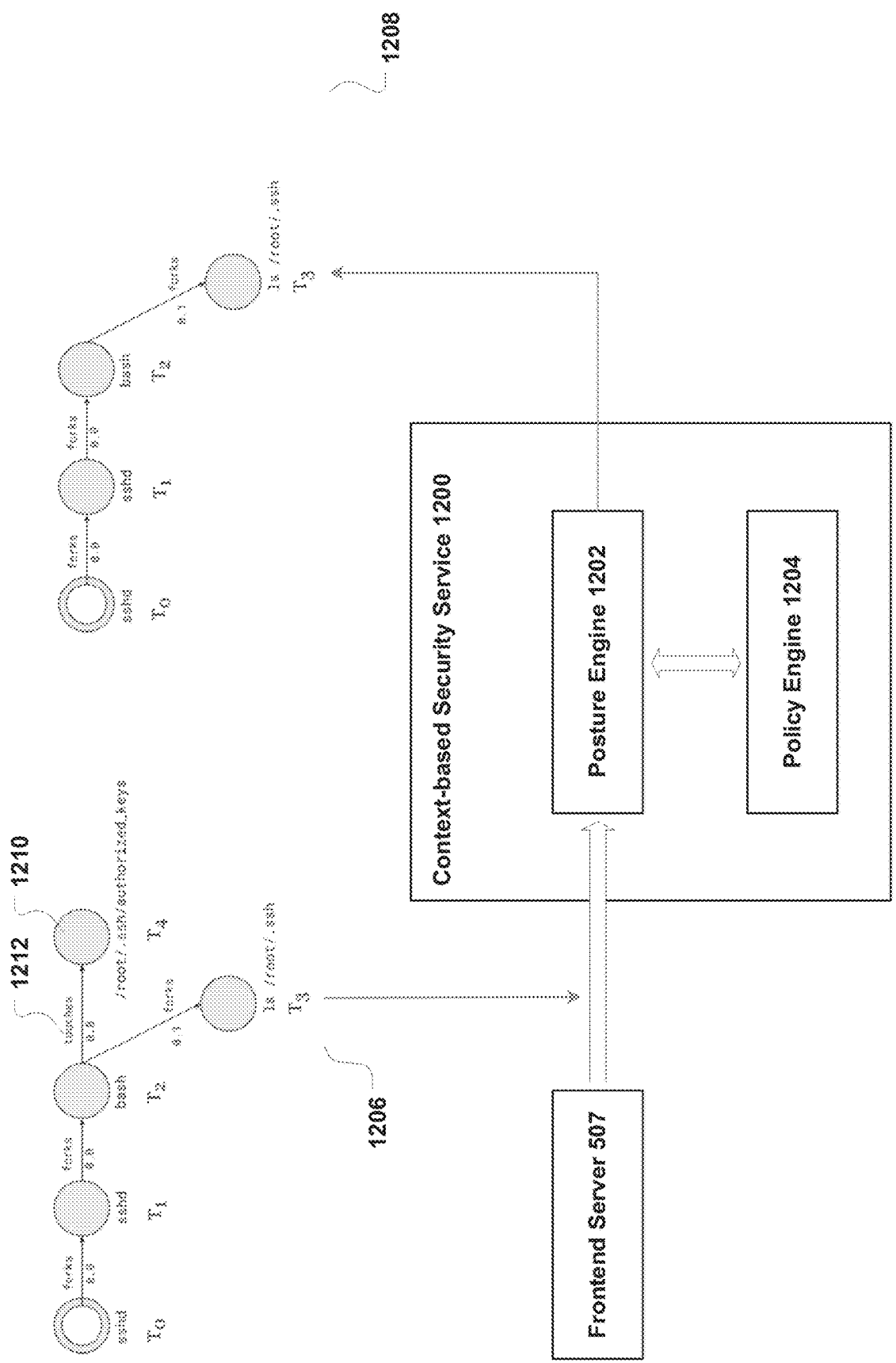
FIG. 12A depicts example components of a context-based security service for performing user operations or controls on an execution graph based on graph edge context.

FIG. 12A depicts example components of a context-based security service 1200 for performing user operations or controls on an execution graph based on graph edge context, according to one implementation. As depicted, the context-based security service 1200 includes a posture engine 1202 and a policy engine 1204. In one implementation, the context-based security service 1200 is supplemental to or part of the central service 100. For example, the posture engine 1202 and the policy engine 1204 are separate components of the central service 100. In another implementation, one or more components of the context-based security service 1200 can be located in an agent. For example, the posture engine 1202 can be part of the in-memory trail processor 402 of the agent 400 in FIG. 4, which communicates with the policy engine 1204 and/or other components (e.g., the frontend server 507) of the central server 100 through one or more API(s).

In one implementation, the posture engine 1202 is a logical interface that exposes a distributed execution graph to a user through one or more APIs and enables the user to operate on the graph. The policy engine 1204 is a logical module that allows an organization/enterprise to create, monitor, and enforce rules about how network resources and data reflected by the graph can be accessed. The posture engine 1202 in communication with the policy engine 1204 can receive and interpret the user operations or controls on the graph, and output and/or visualize an operation result (e.g., a processed graph, a notification) based on processing the user operations or controls. In one implementation, the posture engine 1202 can also provide instructions and/or options that guide the user to operate on the graph (e.g., via one or more user interfaces).

As depicted in FIG. 12A, the posture engine 1202 can receive an execution graph 1206 (as shown above in FIG. 9) through the frontend server 507 from the central service 100, and present the graph 1206 to a user. In one implementation, the user can operate on the graph 1206 using an "if this then that" (IFTTT) approach. For example, an IFTT rule used for automatically tagging an edge/behaviour can be created based on user input. In another implementation, the posture engine 1202 may allow the user to edit the execution graph based on the IFTT approach. Upon receiving and processing the user operation(s) on the graph 1206, the posture engine 1202 can output a graph 1208. In the graph 1208, the /root/.ssh/authorized_keys file of node 1210 on the graph 1206 is removed, for example, based on a user operation of tagging the edge 1212 as malicious. A tagging operation will be described below.

Figure 12B:
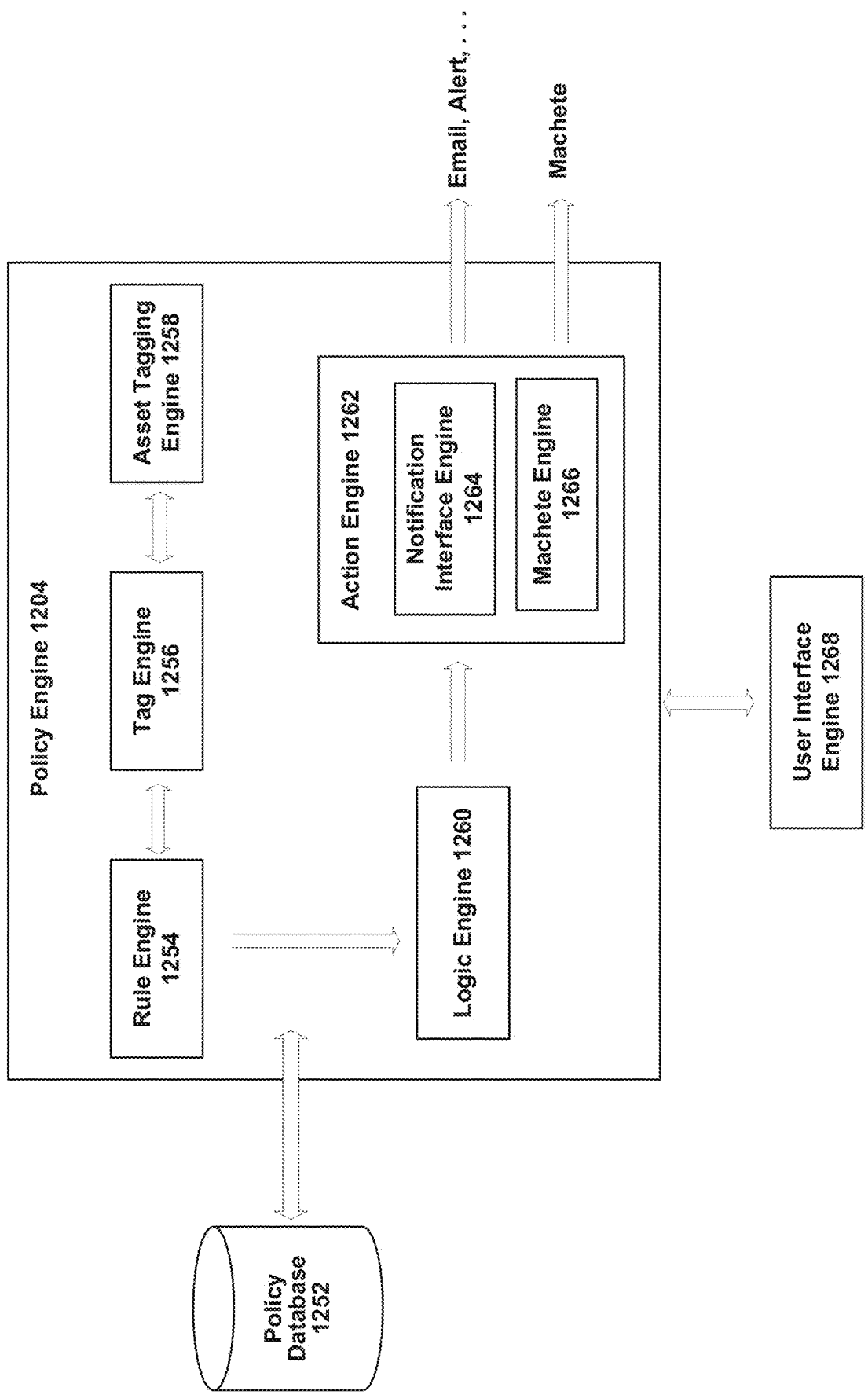
FIG. 12B depicts one implementation of a policy engine in FIG. 12A.

FIG. 12B depicts one implementation of the policy engine 1204 in FIG. 12A. The policy engine 1204 can create policies that facilitate data asset management in an enterprise and store the created policies in a policy database 1252 (e.g., a SQL database). The policy engine 1204 can also process the user operations on an execution graph using one or more policies stored in the policy database 1252. A user can control or operate on both the nodes representing the entities and edges representing the behaviors among the entities in the execution graph. Based on the processing of the user operations using the one or more policies, the policy engine 1204 can communicate with a user interface engine 1268 to generate and output a result to the user. The user interface engine 1268 can generate graphical data for displaying, on a computing device associated with the user, graphical representation(s) of the result. The result can be a processed graph and/or other information (e.g., an email or an alert reflecting the status of the graph). The computing device can be a desktop, a tablet, a mobile device, or other types of personal computers. In one implementation, responsive to processing the user operations on the graph, the policy engine 1204 can in turn adjust and update the policies in the policy database 1252 used for operation processing.

In the implementation depicted in FIG. 12B, the policy engine 1204 includes a rule engine 1254, a tag engine 1256, an asset tagging engine 1258, a logic engine 1260, and an action engine 1262. One skilled in the art will appreciate that alternative components can be included in the policy engine 1204 for performing the functionalities described herein. Although the operation analysis and processing described hereafter mainly focus on the edges of an execution graph or graph edges, one skilled in the art should appreciate that the analysis and processing can also be similarly applied to the nodes of the graph.

The rule engine 1254 specifies a set of rules used to determine which behavior or graph edge representing the behavior should be tagged as malicious or benign. Activities happening across the enterprise infrastructure are mapped into an execution graph and partitioned into intent based execution trails. For example, a user logs into a machine, spawns a shell, conducts scanning of the network, and connects to a database server. These activities may be conducted for a web search and thus are all mapped into a single intent based execution trail. The rule engine 1254 defines the rules that are used to determine whether and which of the logging in, spawning, scanning, and connecting activities can be considered as malicious activities. In one implementation, the rule engine 1254 can construct a frequency rule to indicate whether a certain event or activity occurs over a threshold number of times within a threshold time. One skilled in the art will appreciate other rules similar to the edge rule, path rule or cluster rule described above in reference to FIG. 9 may also be constructed for identifying the risky or malicious behaviors or edges.

The tag engine 1256 applies one or more tags to each edge of an execution trail of the execution graph based on the rules specified by the rule engine 1254. For example, the tag engine 1256 can identify behavior or activity that matches a rule and tag the graph edge associated with the identified activity with a malicious identifier. In one implementation, according to the rules, the tag engine 1256 can identify a type of behavior associated with each edge of the execution trail, and apply the one or more tags to an edge of the execution trail based on the identified type of behavior (e.g., forking a certain process). The tag engine 1256 can also apply the one or more tags to the edges based on the frequency rule. Thus, if the frequency of occurrences of the type of behavior in the execution graph is above a threshold number of times within a threshold time, the tag engine 1256 can tag the edge(s) representing the type of behavior in the graph. The type of behavior and the frequency can be determined based on the context associated with each edge in the execution graph.

For each of the edges in the graph reflecting an activity happening in the infrastructure, the edge carries context through the history of the activity that is associated. As depicted in 1302 and 1304 of the policy structure in FIG. 13, the graph edge context can be spatial and temporal. The spatial context indicates where in the infrastructure a particular edge of the activity is happening, for example, based on hashes of attributes of the activity (e.g., name, type) or hosts/network applications that the activity was originated from or targeted into. The temporal context indicates when a particular edge of the activity is happening, for example, based on the time of the day or the frequency of occurrence of the activity. Therefore, when a user connects to a machine, spawns a shell, scans the network, and connects to a database, the connection to the database carries the context including the user who logged in, the shell spawned, the scanning of the network, etc. In one implementation, the tag engine 1256 along with the rule engine 1254 can identify at least one of the spatial context or temporal context from the edge definitions based on the rules.

The tag engine 1256 can apply the one or more tags to each edge of an execution trail based on at least one of the spatial context or temporal context. For example, if an activity occurs on many edges associated with many nodes in the entire infrastructure, this activity may be determined as opportunistic and indiscriminate based on the rule(s) specified by the rule engine 1254. The tag engine 1256 can then tag the activity and corresponding edges as a benign or untargeted attack (if taken as an attack).

In one implementation, the tag applied to an edge of an execution graph can be one of a tag based on threat intelligence internet protocol (IP), a tag based on threat intelligence file hash, a tag based on host behavior type, a tag based on host operating system (OS), a flow-based tag, a vulnerability-based tag, a virtual private cloud (VPC) based tag, a region-based tag, a location-based tag, etc. These tags can be hashes, IoCs, asset tags, etc.

The tag based on threat intelligence IP is used to solve the IoC overload problem. Every machine connected to a network is exposed to a constant barrage of scans, web crawls, probes, and attacks from thousands of IP addresses every time of every day. From the attack detection and analysis of these network activities, many modern detection systems can generate a large number of alerts. While most of these alerts are false positive, manual triage is required to differentiate between the events/activities stemming from harmless network noise and the activities that have malicious intents. The tag engine 1256 can monitor and correlate the activities based on the behavior relationships between the entities in the execution graph, and add the context to each edge/activity of the graph by using the tag based on threat intelligence IP. As such, the network resources (e.g., computing time, network bandwidth) wasted on differentiating between targeted attack traffic and background noise alerts can be avoided. In one implementation, the tag engine 1256 can determine a tag based on threat intelligence IP using GreyNoise™ products.

Using the tag based on threat intelligence file hash, the tag engine 1256 can associate file hashes to threat activities such as phishing, botnets, or mal ware. The tag engine 1256 can use this tag in a large scale environment to protect and detect potential threats associated with the edges of the execution graph. In one implementation, the tag engine 1256 can determine a tag based on threat intelligence file hash using VirusTotal™ products.

Upon monitoring and analyzing the flow-based network traffic (e.g., east-west flow or north-south flow) based on the rules, the tag engine 1256 can automatically apply a flow-based tag to an edge/activity to solve the time-consuming and low-accuracy problems of manual labeling of real network traffic. The vulnerability-based tag can be used to identify the vulnerability (e.g., accepting unauthenticated remote registration) of a listener (e.g., transparent network substrate (TNS) listener). Depending on a host behavior type such as a web behavior or a database behavior, an activity and the corresponding edge can also be tagged. The tag engine 1256 can further use other types of tags such as tags based on host OS, VPC based tags, region-based tags, and location-based tags that indicate the certain spatial or temporal context of an edge in the graph to identify and label the edge.

In another implementation, the tag engine 1256 allows custom tags to be used to identify an edge. A custom tag can be an IP address and/or subnet based tag, a host name tag, a hash tag, etc. For example, a user can build a regular expression for a host name and tag an edge with the regular expression. The custom tags can extend the user control of graph edges as well as enhance the flexibility and efficiency of attack detection through execution graphs.

The rule engine 1254 determines which behaviors/edges should be tagged as malicious, the tag engine 1256 identifies a specific kind of behavior for tagging, while the asset tagging engine 1258 provides a way to apply machine-into-group tags. For example, the tag engine 1256 can attach a first tag to the activity of a user logging into a machine, and the asset tagging engine 1258 can attach a second tag to the same activity based on whether the machine is a database server or a web server, or whether the logging activity is used for accessing a database server or a web server. Based on various types of tags for an edge, the rules specified by the rule engine 1254 can vary, and thus the different types of tags can serve for different analysis purposes.

Once the tag(s) applied to each edge in an execution graph are determined, the logic engine 1260 is triggered to consume the tags. The logic engine 1260 can analyze the execution trails enriched with the one or more tags and determine an action that is performed to mitigate security risks in the execution graph.

In one implementation, the logic engine 1260 first determines whether the one or more tags meet a policy criterion. Policies are statements used for guiding security decisions. A policy criterion can be an applicable requirement related to processes, actions, and configurations that an enterprise needs to meet to achieve a rational outcome. In the enterprise infrastructure with multiple agents deployed on multiple systems, each policy criterion can be defined and customized for a particular environment of a particular enterprise, e.g., based on input from a user such as an administrator of the particular enterprise. The logic engine 1260 can match a tag associated with a graph edge to a customized policy criterion. For example, depending on whether a first policy criterion for incoming emails (e.g., to avoid malicious intrusion) and a second policy criterion for outcoming emails (e.g., to prevent the leak of confidential information) are both applied to an enterprise environment, the logic engine 1260 can determine a match or a mismatch for a tag associated with an email behavior/edge.

Figure 13:
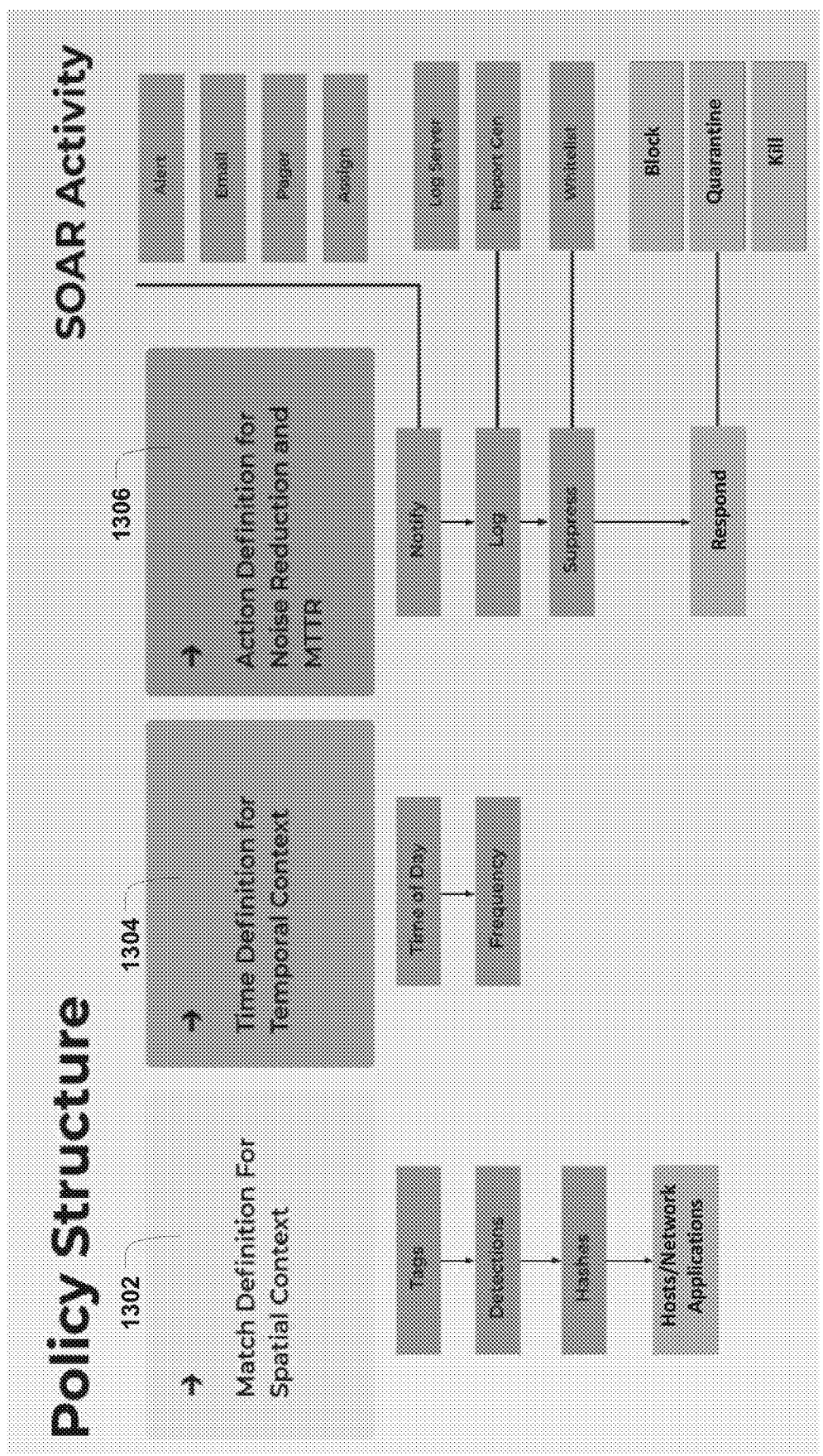
FIG. 13 depicts an example policy structure.

When a tag meets a policy criterion, the logic engine 1260 can generate an action. For example, a policy criterion can be based on the frequency of occurrences of a type of tag. The logic engine 1260 can turn insights based on this criterion into real-time and automated actions by proposing a first action if the frequency of tags is within a first threshold, proposing a second action if the frequency of tags is between the first threshold and a second threshold greater than the first threshold, and so on. The policy criterion can also be used to determine a risk level (e.g., in combination with the risk score described in FIGS. 9 and 10) such that different levels of actions (e.g., kill a behavior associated with the edge or just log the risky edge) can be generated. FIG. 13 lists example actions 1306 such as notifying, logging, suppressing, or responding as described below.

The logic engine 1260 transmits the action to the action engine 1262. Upon receiving the action, the action engine 1262 can determine whether and how to take the action. For example, the action engine 1262 can determine whether to take the action in real time or by which of the email or pager to send a notification to a user. The action can be taken to reduce noises (e.g., harmless network activities) in a particular enterprise environment and to reduce the amount of time used to neutralize an identified threat within the environment (e.g., the mean time to respond (MTTR)).

As depicted in FIG. 12B, the action engine 1262 can include a notification engine 1264 and a machete engine 1266, one of which can be initiated to perform an action as a response to receiving the action from the logic engine 1260. In one implementation, the notification engine 1264 can notify a user of the status (e.g., malicious, benign) of an edge. For example, the notification engine 1264 in conjunction with the user interface engine 1268 can prompt an alert of a malicious behavior/edge to a user or send an email notifying the status to the user. The notification engine 1264 can also send a pager message about the status to the user, or assign another user or application to further process or act on the status. Alternatively or additionally, the notification engine 1264 can communicate with and instruct a log server to log the status and/or generate a report about the status.

On the other hand, the machete engine 1266 may perform suppress or response actions. The machete engine 1266 can perform a suppress action based on maintaining a whitelist (or blacklist) such that subsequent data access behaviors with a certain tag(s) can be restricted. The machete engine 1266 can also perform a response action by blocking the edge, quarantining the edge, or killing a behavior associated with the edge. In one implementation, blocking the edge can include stopping attributing the behavior associated with the edge to the local and/or global execution trail in the execution graph, quarantining the edge can include separating the behavior associated with the edge from the execution graph, and killing a behavior associated with the edge can include removing the one or more nodes associated with the edge in the graph. The actions can be customized to a particular environment, for example, which node associated with the edge should be removed.

Figure 14:
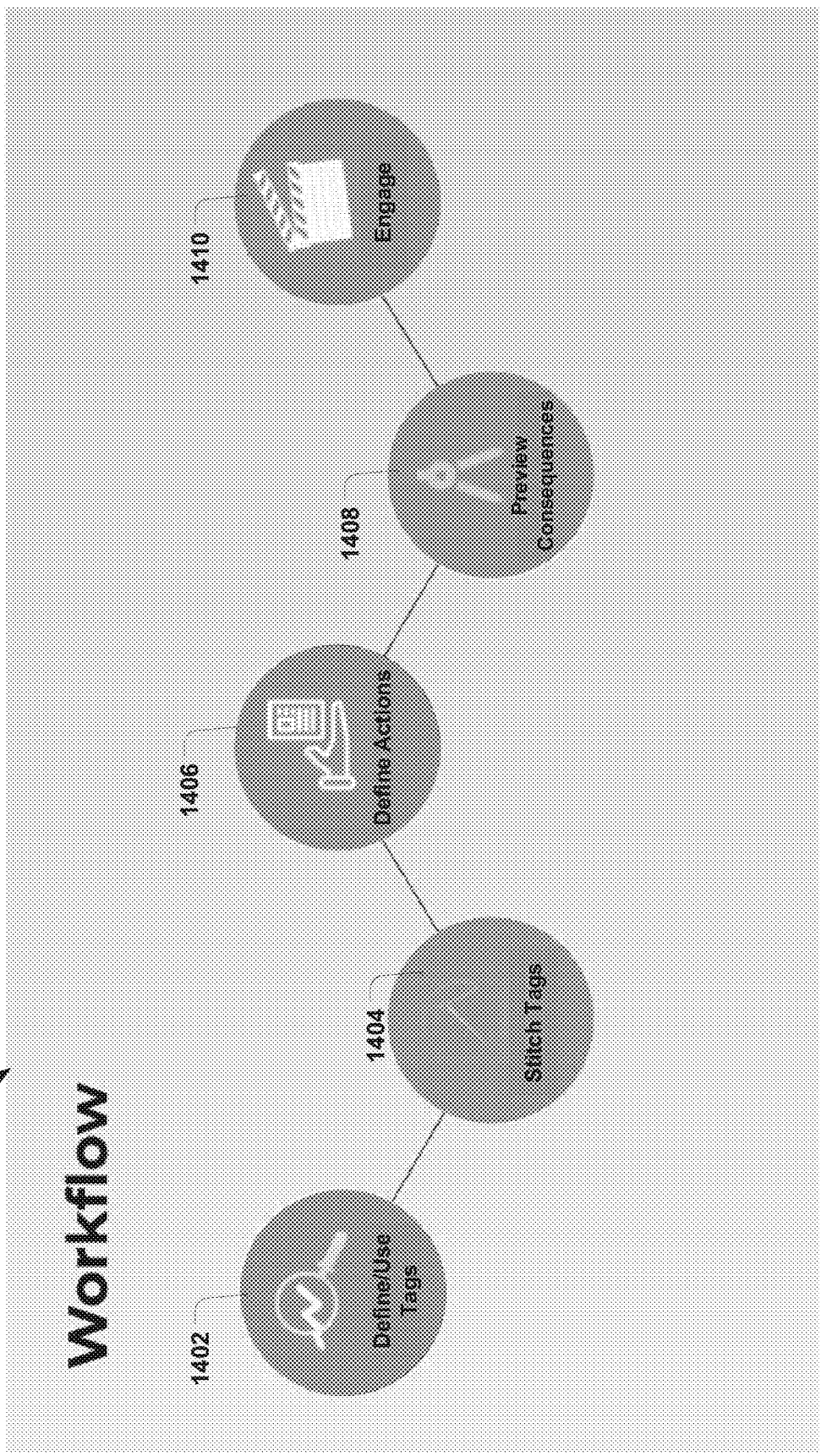
FIG. 14 depicts an example high-level workflow for performing user controls based on tagging graph edges.

FIG. 14 depicts an example high-level workflow 1400 for performing user controls based on tagging graph edges. In one implementation, the workflow can be implemented by the posture engine 1202 and the policy engine 1204 in communication with other components of the agent 400 and central service 100.

As depicted, the workflow 1400 starts with step 1402, where tags are defined and used. A tag applied to an edge of an execution graph can be one of a tag based on threat intelligence internet protocol (IP), a tag based on threat intelligence file hash, a tag based on host behavior type, a tag based on host operating system (OS), a flow-based tag, a vulnerability-based tag, a virtual private cloud (VPC) based tag, a region-based tag, a location-based tag, etc. At step 1404, the tags associated with graph edges are stitched. Rather than analyzing a single tag, the types of tags, the frequencies of occurrence of a type of tags, or other attributes of the tags can be analyzed to stitch the tags together to obtain integrated security risk information. Based on the obtained information, at step 1406, one or more actions that are performed to mitigate security risks can be defined. For example, different levels of actions such as logging a risky edge in a log server or blocking the edge can be determined. Once an action is determined, at step 1408, the action can be tested by previewing the consequences of performing the action. For example, if logging a risk edge cannot reduce the influence of the edge on attack progression in an execution graph, the edge should be blocked. Based on the consequence preview, the workflow 1400 then proceeds to step 1410 to actually perform an appropriate action to mitigate security risks.

Figure 15:
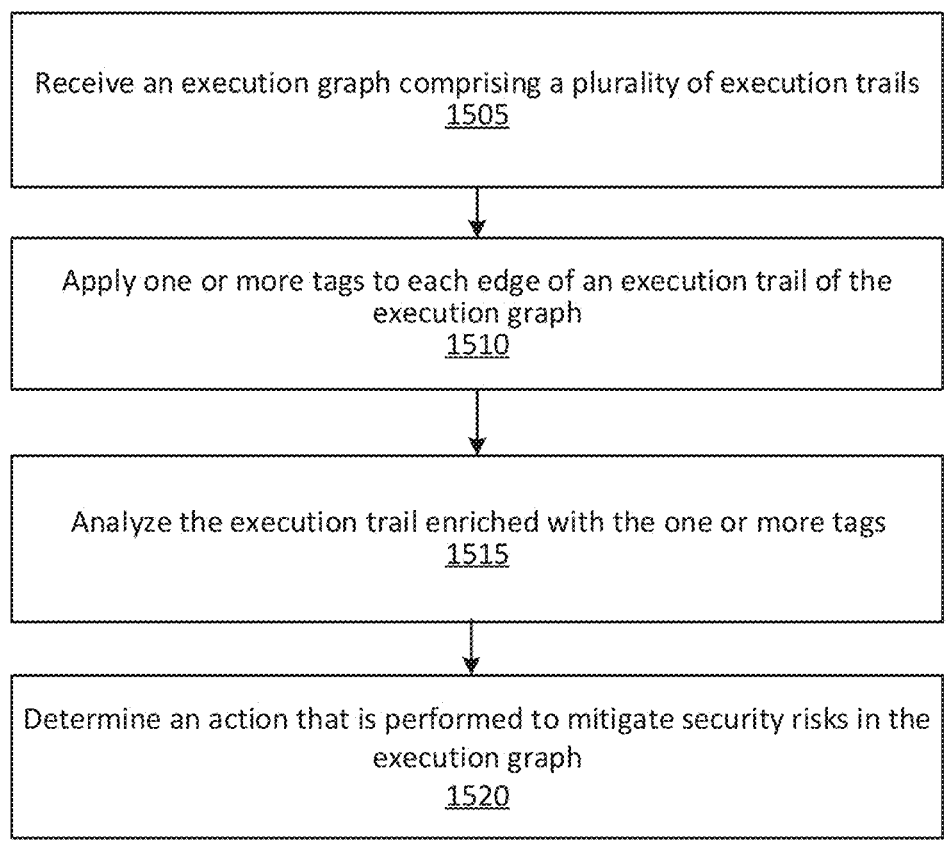
FIG. 15 depicts an example process for performing user controls based on tagging graph edges.

FIG. 15 depicts an example process 1500 for performing user controls based on tagging graph edges. In one implementation, the process 1500 can be implemented by the posture engine 1202 and the policy engine 1204 in communication with other components of the agent 400 and central service 100.

At step 1505, an execution graph comprising a plurality of execution trails is received. The execution graph is constructed by a central service based on behaviors monitored by a plurality of agents deployed on respective systems including a first system. The execution graph comprises a plurality of nodes and a plurality of edges connecting the nodes, each node represents an entity comprising a process or an artifact, each edge represents an event associated with the entity, and each execution trail is associated with a subset of the nodes and edges of the execution graph.

At step 1510, one or more tags are applied to each edge of an execution trail of the execution graph based on at least one of temporal context or spatial context associated with the edge. The one or more behaviors associated with the edge of the execution trail happen across an enterprise infrastructure involving the first system. The spatial context indicates where in the enterprise infrastructure a particular edge of activity is happening, for example, based on hashes of attributes of the activity (e.g., name, type). The temporal context indicates when a particular edge of the activity is happening, for example, based on the time of the day or the frequency of occurrence of the activity.

At step 1515, the execution trail enriched with the one or more tags is analyzed. For example, it is determined whether a tag meets a policy criterion based on the frequency of occurrence of the edges labeled with the tag. At step 1520, an action that is performed to mitigate security risks in the execution graph can be determined by the first operating system and based on the analysis. The action can comprise at least one of notifying a status of the edge, logging the action in a log server, generating a report, maintaining a whitelist, or performing a response action by blocking the edge, quarantining the edge, or killing a behavior associated with the edge.

Multimodal Sources

In one implementation, the present system includes a multimodal security middleware architecture that enhances execution graphs by supplementing the graphs with detection function results derived from multiple sources rather than a single source (e.g., events identified by agents executing on host systems). The multimodal security middleware is responsible for enhancing activity postures into security postures, in online, real-time, as well as near-real time fashion. Multimodal sources can include (1) rule based online graph processing analytics, (2) machine learning based anomaly detection, (3) security events reported from host operating systems, (4) external threat intelligence feeds, and (5) preexisting silo security solutions in an infrastructure. Detection results from each of these sources can be applied to the underlying trails, thereby contributing to the riskiness of an execution sequence developing towards an attack progression. Being multimodal, if an activity subset within an execution trail is detected as an indicator of compromise by multiple sources, the probability of false positives on that indicator of compromise is lowered significantly. Moreover, the multimodal architecture ensures that the probability of overlooking an indicator of compromise is low, as such indicators will often be identified by multiple sources. A further advantage of the multimodal architecture is that specific behaviors that cannot be expressed generically, such as whether a host should communicate to a particular target IP address, or whether a particular user should ever log in to a particular server, can be reliability detected by the system.

In one implementation, the multimodal middleware includes an online component and a nearline component. Referring back to FIG. 5, the online and nearline components can be included in In-memory Local Trail Processor 502. The online component includes a rule-based graph analytic processor subcomponent and a machine learning based anomaly detector subcomponent. The nearline component consumes external third-party information, such as third-party detection results and external threat intelligence feeds. As execution trails are modeled using host and network-based entity relationships, they are processed by the rule-based processor and machine learning based anomaly detector, which immediately assign risk scores to single events or sets of events. Information from the nearline components is mapped back to the execution trails in a more asynchronous manner to re-evaluate their scores. Some or all of the sources of information can contribute to the overall score of the applicable execution trails to which the information is applicable.

Security information from external solutions is ingested by the nearline component, and the middleware contextualizes the information with data obtained from sensors. For example, a firewall alert can take the form source ip:source port to target ip:target port traffic denied. The middleware ingests this alert and searches for a process network socket relationship from the subgraph, where the network socket matches the above source ip:source port, target ip:target port. From this, the middleware is able to determine to which trail to map the security event. The score of the event can be derived from the priority of the security information indicated by the external solution from which the information was obtained. For example, if the priority is "high", a high risk score can be associated with the event and accumulated to the associated trail.

Operating systems generally have internal detection capabilities. The middleware can ingest security events reported from host operating systems in the same manner described above with respect to the security information obtained from external solutions. The nearline component of the middleware is also able to ingest external threat intelligence feeds, such as alerts identifying process binary names, files, or network IP addresses as suspicious. The middleware can contextualize information received from the feeds by querying entity relationships to determine which events in which trails are impacted by the information. For example, if a particular network IP address is blacklisted, each trail containing an event associated with the IP (e.g., process connects to a socket where the remote IP address is the blacklisted address) can be rescored based on a priority set by the feed provider.

Within the online component, the rule-based graph stream processing analytics subcomponent works inline with streams of graph events that are emitted by system event tracking sensors executing on operating systems. This subcomponent receives a set of rules as input, where each rule is a set of one or more conditional expressions that express system level behaviors based on OS system call event parameters. The rules can take various forms, as described above.

The machine learning based anomaly detection subcomponent will now be described. In some instances, depending on workloads, certain behavioral rules cannot be generically applied on all hosts. For example, launching a suspicious network tool may be a malicious event generally, but it may be the case that certain workloads on certain enterprise servers are required to launch the tool. This subcomponent attempts to detect anomalies as well as non-anomalies by learning baseline behavior from each individual host operating system over time. It is to be appreciated that various known machine learning and heuristic techniques can be used to identify numerous types of anomalous and normal behaviors. Behaviors detected by the subcomponent can be in the form of, for example, whether a set of events are anomalous or not (e.g., whether process A launching process B is an anomaly when compared against the baseline behavior of all process relationships exhibited by a monitored machine). This detection method is useful in homogenous workload environments, where deviation from fixed workloads is not expected. Detected behaviors can also be in the form of network traffic anomalies (e.g., whether a host should communicate or receive communicate from a particular IP address) and execution anomalies (e.g., whether a source binary A should directly spawn a binary B, whether some descendant of source binary A should ever spawn binary B, etc.). The machine learning based anomaly detection subcomponent provides a score for anomalies based on the standard deviation from a regression model. The score of a detected anomaly can be directly accumulated to the underlying trail.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 16:
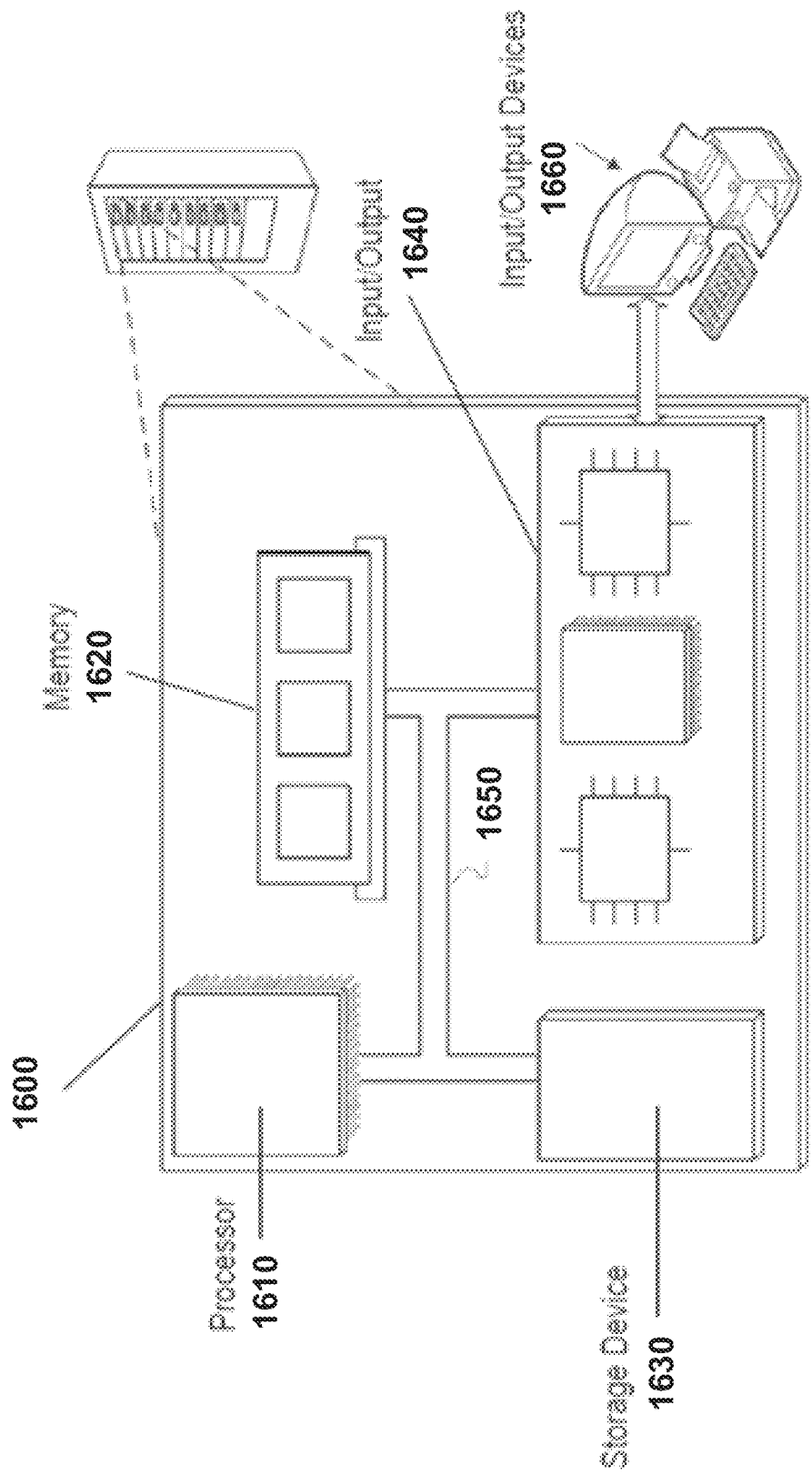
FIG. 16 depicts a block diagram of an example computer system.

FIG. 16 is a block diagram of an example computer system 1600 that may be used in implementing the technology described in this document. General-purpose computers, network appliances, mobile devices, or other electronic systems may also include at least portions of the system 1600. The system 1600 includes a processor 1610, a memory 1620, a storage device 1630, and an input/output device 1640. Each of the components 1610, 1620, 1630, and 1640 may be interconnected, for example, using a system bus 1650. The processor 1610 is capable of processing instructions for execution within the system 1600. In some implementations, the processor 1610 is a single-threaded processor. In some implementations, the processor 1610 is a multi-threaded processor. The processor 1610 is capable of processing instructions stored in the memory 1620 or on the storage device 1630.

The memory 1620 stores information within the system 1600. In some implementations, the memory 1620 is a non-transitory computer-readable medium. In some implementations, the memory 1620 is a volatile memory unit. In some implementations, the memory 1620 is a non-volatile memory unit.

The storage device 1630 is capable of providing mass storage for the system 1600. In some implementations, the storage device 1630 is a non-transitory computer-readable medium. In various different implementations, the storage device 1630 may include, for example, a hard disk device, an optical disk device, a solid-date drive, a flash drive, or some other large capacity storage device. For example, the storage device may store long-term data (e.g., database data, file system data, etc.). The input/output device 1640 provides input/output operations for the system 1600. In some implementations, the input/output device 1640 may include one or more of a network interface device, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1630 may be implemented in a distributed way over a network, such as a server farm or a set of widely distributed servers, or may be implemented in a single computing device.

Although an example processing system has been described in FIG. 16, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The invention claimed is:

1. A computer-implemented method for identifying infrastructure attacks based on graph edge context, the method comprising:
   receiving an execution graph constructed by a central service based on behaviors monitored by a plurality of agents deployed on respective systems including a first system, wherein the execution graph comprises a plurality of execution trails;
   applying a first tag to a first edge of an execution trail of the execution graph based on temporal context associated with the first edge, wherein one or more behaviors associated with each edge of the execution trail happen across an enterprise infrastructure involving the first system;
   applying a second tag to a second edge of the execution trail of the execution graph based on spatial context associated with the second edge,
   wherein one or more behaviors associated with each edge of the execution trail happen across an enterprise infrastructure involving the first system;
   analyzing the execution trail enriched with the one or more tags; and
   determining, based on the analysis, an action that is performed to mitigate security risks in the execution graph.

2. The method of claim 1, wherein the execution graph comprises a plurality of nodes and a plurality of edges connecting the nodes, each node represents an entity comprising a process or an artifact, each edge represents an event associated with the entity, and each execution trail is associated with a subset of the nodes and edges of the execution graph.

3. The method of claim 1, further comprising identifying a type of behavior associated with each edge of the execution trail, wherein applying the first tag or the second tag is also based on the identified type of behavior.

4. The method of claim 1, further comprising:
   determining whether at least one of the first or second tags meets a policy criterion, wherein the policy criterion is defined for the enterprise infrastructure of the first system; and
   responsive to determining that the at least one tag meets the policy criterion, determining the action that is customized to the enterprise infrastructure of the first system and is performed to mitigate the security risks.

5. The method of claim 1, wherein applying the first tag or the second tag comprises tagging the first or second edge as malicious or benign based on a set of rules.

6. The method of claim 1, wherein applying the first tag or the second tag is based on a frequency of occurrences of a type of behavior in the execution graph.

7. The method of claim 1, further comprising communicating with the first system to perform the action.

8. The method of claim 7, wherein the action comprises at least one of notifying a status of the first or second edge, logging the action in a log server, generating a report, maintaining a whitelist, or performing a response action by blocking, quarantining, or killing a behavior associated with the first or second edge.

9. A system for identifying infrastructure attacks based on graph edge context, the system comprising:
   a processor; and
   a memory storing computer-executable instructions that, when executed by the processor, program the processor to perform the operations of:
      receiving an execution graph constructed by a central service based on behaviors monitored by a plurality of agents deployed on respective systems including a first system, wherein the execution graph comprises a plurality of execution trails;
      applying a first tag to a first edge of an execution trail of the execution graph based on temporal context associated with the first edge, wherein one or more behaviors associated with each edge of the execution trail happen across an enterprise infrastructure involving the first system;
      applying a second tag to a second edge of the execution trail of the execution graph based on spatial context associated with the second edge,
      wherein one or more behaviors associated with each edge of the execution trail happen across an enterprise infrastructure involving the first system;
      analyzing the execution trail enriched with the one or more tags; and
      determining, based on the analysis, an action that is performed to mitigate security risks in the execution graph.

10. The system of claim 9, wherein the execution graph comprises a plurality of nodes and a plurality of edges connecting the nodes, each node represents an entity comprising a process or an artifact, each edge represents an event associated with the entity, and each execution trail is associated with a subset of the nodes and edges of the execution graph.

11. The system of claim 9, wherein the computer-executable instructions that, when executed by the processor, further program the processor to perform the operation of identifying a type of behavior associated with each edge of the execution trail, wherein applying the first tag or the second tag is also based on the identified type of behavior.

12. The system of claim 9, wherein the computer-executable instructions that, when executed by the processor, further program the processor to perform the operations of:
   determining whether at least one of the first or second tags meets a policy criterion, wherein the policy criterion is defined for the enterprise infrastructure of the first system; and
   responsive to determining that the at least one tag meets the policy criterion, determining the action that is customized to the enterprise infrastructure of the first system and is performed to mitigate the security risks.

13. The system of claim 9, wherein, to apply the first tag or the second tag, the computer-executable instructions that, when executed by the processor, further program the processor to perform the operation of tagging the first or second edge as malicious or benign based on a set of rules.

14. The system of claim 9, wherein applying the first tag or the second tag is based on a frequency of occurrences of a type of behavior in the execution graph.

15. The system of claim 9, wherein the computer-executable instructions that, when executed by the processor, further program the processor to perform the operation of the first system communicating with the first system to perform the action.

16. The system of claim 15, wherein the action comprises at least one of notifying a status of the first or second edge, logging the action in a log server, generating a report, maintaining a whitelist, or performing a response action by blocking the first or second edge, quarantining the first or second edge, or killing a behavior associated with the first or second edge.

17. A computer program product for identifying infrastructure attacks based on graph edge context, the computer program product comprising a non-transitory computer readable medium having computer readable program code stored thereon, the computer readable program code configured to:
receive an execution graph constructed by a central service based on behaviors monitored by a plurality of agents deployed on respective systems including a first system, wherein the execution graph comprises a plurality of execution trails;
apply a first tag to a first edge of an execution trail of the execution graph based on temporal context associated with the first edge, wherein one or more behaviors associated with each edge of the execution trail happen across an enterprise infrastructure involving the first system;
apply a second tag to a second edge of the execution trail of the execution graph based on spatial context associated with the second edge,
wherein one or more behaviors associated with each edge of the execution trail happen across an enterprise infrastructure involving the first system;
analyze the execution trail enriched with the one or more tags; and
determine, based on the analysis, an action that is performed to mitigate security risks in the execution graph.

18. The computer program product of claim 17, wherein the execution graph comprises a plurality of nodes and a plurality of edges connecting the nodes, each node represents an entity comprising a process or an artifact, each edge represents an event associated with the entity, and each execution trail is associated with a subset of the nodes and edges of the execution graph.

19. The computer program product of claim 17, wherein the computer readable program code is further configured to identify a type of behavior associated with each edge of the execution trail, wherein applying the first tag or the second tag is also based on the identified type of behavior.

20. The computer program product of claim 17, wherein the computer readable program code is further configured to:
determine whether at least one of the first or second tags meets a policy criterion, wherein the policy criterion is defined for the enterprise infrastructure of the first system; and
responsive to determining that the at least one tag meets the policy criterion, determine the action that is customized to the enterprise infrastructure of the first system and is performed to mitigate the security risks.

* * * * *